(12) United States Patent
Li et al.

(10) Patent No.: US 10,227,470 B2
(45) Date of Patent: Mar. 12, 2019

(54) RECYCLED COMPOSITE MATERIALS AND RELATED METHODS

(71) Applicants: Washington State University, Pullman, WA (US); GFSI Group LLC, Mill Creek, WA (US)

(72) Inventors: Hui Li, Pullman, WA (US); Karl Englund, Moscow, ID (US); Don Lilly, Bothell, WA (US)

(73) Assignees: Washington State University, Pullman, WA (US); GFSI Group LLC, Mill Creek, WA (US)

( * ) Notice: Subject to any disclaimer, the term of this patent is extended or adjusted under 35 U.S.C. 154(b) by 17 days.

(21) Appl. No.: 15/673,704

(22) Filed: Aug. 10, 2017

(65) Prior Publication Data

US 2017/0362406 A1 Dec. 21, 2017

Related U.S. Application Data

(63) Continuation-in-part of application No. 14/691,506, filed on Apr. 20, 2015, now abandoned, which is a
(Continued)

(51) Int. Cl.
*C08J 11/00* (2006.01)
*B29B 17/00* (2006.01)
(Continued)

(52) U.S. Cl.
CPC ............... *C08J 11/00* (2013.01); *B29B 9/10* (2013.01); *B29B 17/00* (2013.01);
(Continued)

(58) Field of Classification Search
CPC . B29B 17/00; B29B 17/0042; B29B 17/0404; B29B 17/0412; B29B 2017/0089; B29B 2017/0484; B29B 9/10; B29C 2793/0081; B29C 70/12; B29K 2105/06; B29K 2105/246; B29K 2709/08; B29L 2031/085; C08J 11/00; C08J 2367/00; C08J 5/043; Y02P 70/523; Y02W 30/62; Y02W 30/625
See application file for complete search history.

(56) References Cited

U.S. PATENT DOCUMENTS 5,569,424 A * 10/1996 Amour ............... B29B 17/0026
264/115
2011/0034570 A1 2/2011 Smith et al.
(Continued)

FOREIGN PATENT DOCUMENTS

DE 3839986 A1 5/1990
KR 20050017280 A 2/2005

OTHER PUBLICATIONS www/appropedia.com: "Recycling of Wind Turbine Blades", Pearce et al, Dec. 22, 2009, entire article.*

*Primary Examiner* — Frances Tischler
(74) *Attorney, Agent, or Firm* — W & C IP

(57) ABSTRACT

Methods of producing particles of fiber and resin from fiber-resin composite materials are disclosed. The particles may be combined with a resin system and optionally combined with fillers, binders or reinforcements to produce new cured solid composite products.

10 Claims, 11 Drawing Sheets

Related U.S. Application Data continuation of application No. 13/048,865, filed on Mar. 15, 2011, now Pat. No. 9,028,731.

(60) Provisional application No. 61/340,286, filed on Mar. 15, 2010, provisional application No. 62/408,971, filed on Oct. 17, 2016.

(51) Int. Cl.
| | |
|---|---|
| *C08J 5/04* | (2006.01) |
| *B29B 9/10* | (2006.01) |
| *B29C 70/12* | (2006.01) |
| *B29B 17/04* | (2006.01) |
| *B29K 105/24* | (2006.01) |
| *B29L 31/08* | (2006.01) |
| *B29K 709/08* | (2006.01) |
| *B29K 105/06* | (2006.01) |

(52) U.S. Cl.
CPC ...... *B29B 17/0042* (2013.01); *B29B 17/0404* (2013.01); *B29B 17/0412* (2013.01); *B29C 70/12* (2013.01); *C08J 5/043* (2013.01); *B29B 2017/0089* (2013.01); *B29B 2017/0484* (2013.01); *B29C 2793/0081* (2013.01); *B29K 2105/06* (2013.01); *B29K 2105/246* (2013.01); *B29K 2709/08* (2013.01); *B29L 2031/085* (2013.01); *C08J 2367/00* (2013.01); *Y02P 70/523* (2015.11); *Y02W 30/62* (2015.05); *Y02W 30/625* (2015.05)

(56) References Cited

U.S. PATENT DOCUMENTS

| | | |
|---|---|---|
| 2012/0159785 A1 | 6/2012 | Pyles et al. |
| 2015/0225529 A1 | 8/2015 | Weyant et al. |

* cited by examiner

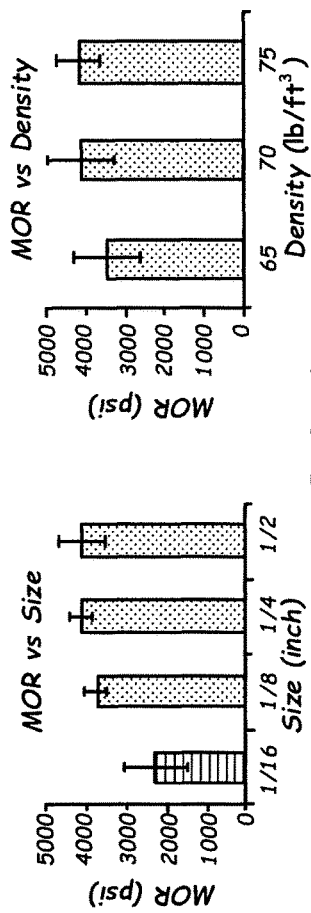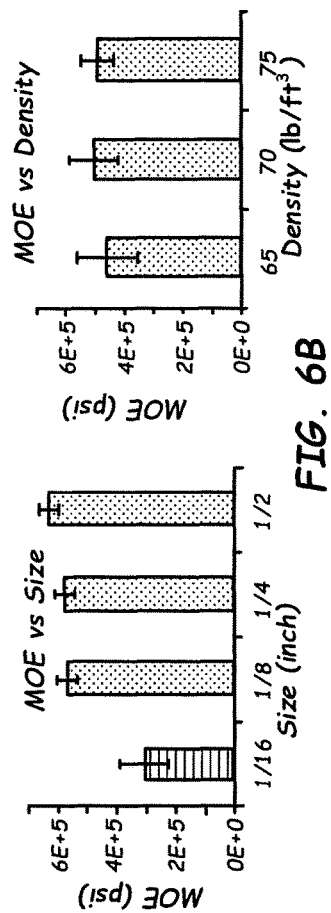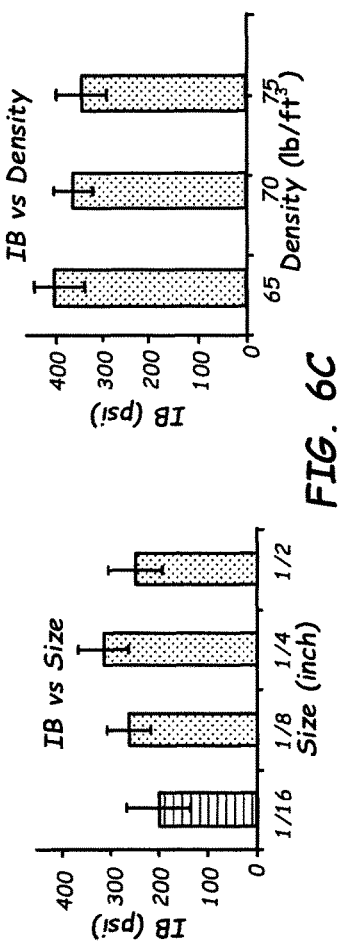
FIG. 6A
FIG. 6B
FIG. 6C

RECYCLED COMPOSITE MATERIALS AND RELATED METHODS

CROSS-REFERENCE TO RELATED APPLICATIONS

The present application is a Continuation-in-Part of U.S. patent application Ser. No. 14/691,506, filed Apr. 20, 2015 entitled Recycled Composite Materials and Related Methods, which in turn is a Continuation of U.S. patent application Ser. No. 13/048,865 now U.S. Pat. No. 9,028,731 also entitled Recycled Composite Materials and Related Methods filed on Mar. 15, 2011, and which claims priority benefit under 35 U.S.C. § 119 of U.S. Provisional Application No. 61/340,286, filed on Mar. 15, 2010. The present application also claims under 35 U.S.C. § 119, the priority benefit of U.S. Provisional Application No. 62/408,971, filed Oct. 17, 2016. All of the aforementioned patent applications and patents are incorporated herein by reference in their entirety.

FIELD OF THE INVENTION

The present embodiments herein relate to the recycling and reuse of composite materials, in particular, to the recycling and reuse of wind turbine materials to create composite materials, such as, particle boards.

BACKGROUND OF THE INVENTION

Discussion of the Related Art

Nearly every industry utilizes fiberglass and fiber-reinforced materials for a variety of components and products. Worldwide demand for these materials has exploded due to an increased demand for both consumer and industrial products, most notably in electronics, aircraft, construction, renewable energy, automotive, and infrastructure development (e.g. public structures). In the United States, China, and India, nearly 80% of consumer purchases are discarded after a single use. These economies offer a tremendous opportunity to capitalize on the surplus of useable waste materials. The global demand for clean energy and infrastructure up-gradation is also expected to boost the composite fiber glass industry's growth in the future.

In many ways, however, fiberglass and fiber-reinforced materials have become problematic both in consumer and commercial markets due to negative environmental effects. Fiberglass insulation, among other products, for example, is now viewed as a potential hazard to the environment and one's health if inhaled. In fact, the state of California mandates "fiberglass producers to use at least thirty percent post-consumer cutlet in fiberglass building insulation made or sold in California" (California Integrated Waste Management Board, 2009). At the same time, there is a growing demand for recycling and recycled consumer products in the U.S. According to the Environmental Protection Agency, Americans are recycling now more than ever in U.S. history. In 1990, Americans recycled 16% of waste, a percentage that increased to 32% in 2005. Municipal solid waste also decreased by two million tons to just under 246 million tons nationwide.

Fiberglass and other fiber-reinforced materials have long been difficult to recycle into new and useful products. Some manufacturers of fiberglass goods, for example, are trying to dramatically increase use of reclaimed fiberglass in the production processes. While these companies have investigated methods to reclaim fiberglass for consumer products both domestically and abroad, manufacturers have only been able to obtain sufficient reclaimed fiberglass to replace ten to twenty-five percent of virgin resins used in fiberglass products. Wind turbine (WT) blades in particular, are large scale items comprised of glass fiber (fiber polymer matrix) composites (GFC) with a wood core in certain regions of the blade and often with a 70/30 GFC/wood ratio by weight. The polymer matrix can be thermoset resins such as epoxy, polyester or vinyl ester resins. The resin is cured (does not soften upon heating) and is part of the recyclable wind turbine (rWTB) mixture. In proportion, glass fiber reinforced polymer (GFRP) represents approximately two-thirds of the total weight of the blade. In many cases, such large-scale items, i.e., composite windmill turbine blades, are simply buried in landfills or burned.

There are many reasons for the interest in maximizing the use of reclaimed fiber-reinforced products, such as recycling the aforementioned wind turbine blades. While reclaimed fiberglass offers a way to reduce manufacturing costs, environmental concerns are also motivating manufacturers to reuse or recycle fiber-reinforced products. Consumers are showing a preference for environmentally aware manufacturers, and the federal and state governments are often investigating the mandating of a timetable to eliminate fiberglass from the waste stream or mandating the use of recycled composite materials in finished goods.

A primary reason why past attempts at recycling fiberglass have failed is because a collection system to ensure an ample supply of incoming materials was not in place. In addition, many of the ventures failed because they could not get enough raw materials to meet the demands. Furthermore, the concerns of contingent liability prevented some generators from sending materials to be recycled.

With respect to wind turbine blades, such components have a predicted lifetime of 20 to 25 years and currently there is no acceptable and affordable solution for breaking down the discarded materials and thereafter recycling such materials for reconstruction into beneficial alternative products. There are three different methods for recycling: mechanical, thermal, and chemical. The mechanical technique in particular, which is the simplest method and the only solution presently brought to a commercial level, utilizes shredders, wherein the produced material results in pieces of composites, glass fibers and a matrix powder. The technique in particular attempts to reduce the amount of virgin glass fiber, which lowers the cost of the final reconstructed product. However, shredded composites, as the only reinforcement part in manufactured composites has continued to be difficult.

With respect to the lack of recyclable fiber reinforced raw materials, a possible solution, which could also aid a correlated collection system, is to look at tracking the abundance of discarded blade components resultant from the wind farm industry so as to have a data base of available discarded wind turbine blade components. However, there is no current beneficial tracking methodology and/or system in place for the reuse, remanufacturing, incineration or disposal of the wind turbine blade material for recycling into beneficial products, such as the new polymer composites, as disclosed herein.

Background information for a methodology of providing products from recycled reinforced plastics, is described and claimed in U.S. Pat. No. 8,361,358 entitled "Method of Recycling Fiberglass reinforced Plastics," filed Mar. 6, 2007, to Robert J Wolf, including the following, "[a] method of recycling fiberglass reinforced plastics. The steps include grinding used fiber reinforced plastic material such as scraps with a grinder into a predetermined length to form a grinded reinforced plastic material. The grinded reinforced material is then mixed with a mixing agent to form a composite material that is heated in order to cure the composite material to form a panel."

Background information for a methodology of recycling waste composite material is described and claimed in U.S. Pat. No. 5,569,424, entitled "Method of Recycling Fiberglass reinforced Plastics," filed Mar. 9, 1995, to William E Amour, including the following, "[a] method and apparatus for recycling waste composite materials. The method includes prechopping cured waste composite materials into manageably sized strips, conditioning the prechopped strips into resin particulate and loose fibers having a length of approximately one-half to one and one-half inches, mixing the resin particulate and loose fibers with an uncured resin, and placing the resultant mixture into a mold having a forming surface contoured to form a composite part. The strips of the composite material are conditioned by running them through a conditioner that includes a high-speed rotating blade. The rotating blade includes a plurality of angled cutting tips that chop up the waste composite material into loose fibers and resin particulate. The resin particulate and loose fibers pass through holes in a cylindrical screen that surrounds the cutting blade and cutting tips."

Background information for a methodology of providing recycled fiber reinforced resin containing product, is described and claimed in U.S. Pat. No. 5,681,194, entitled "Recycled fibre reinforced resin containing product," filed Dec. 12, 1994, to Richard Baker, including the following, "[a] recycled fiber reinforced resin containing product comprising a quantity of fiber reinforced resin pieces mixed together with a quantity of granular aggregate material, and a binder, in which the fiber reinforced resin pieces and the granular aggregate are intermixed with and embedded in the binder, the binder being selected from materials having an initially plastic state, in which fiber reinforced resin pieces and granular aggregate may be intermixed, and the binder materials being thereafter hardenable at room temperature into a hard mass without the application of heat, and a method of manufacturing such a recycled fiber reinforced resin containing product, and apparatus for the manufacture of such a recycled fiber reinforced resin containing product." Additional background on recycling wind turbine blades is described in, "Recycling of Wind Turbine Blades," (www.appropedia.com) by Pearce et al., and as described in "Recycling of Wind Turbine Blades," Renewable Energy Focus, by Pearce et al., No. 9(7), pp 70-73, 2009.

Background information for a methodology of providing composite structural components, is described and claimed in U.S. Application No. 2001/0051249, entitled "Composite Structural Components for Outdoor Use," published Dec. 13, 2001, to Gagas et al., including the following, "[a] structure according to the invention comprises a series of interconnected structural members. The structural members, such-as panels, are made of a composition comprising as its first essential ingredient a cured (cross-linked) resin having sufficient strength when filled as described below to support weights up to about 700 pounds without significant buckling, but which has sufficient resilience to flex and rebound from impacts such as low speed collisions with small boats or dropping of heavy human-carried objects without cracking or breaking. The cured resin matrix contains a first filler consisting essentially of inorganic particles effective to improve the impact resistance and flame resistance of the structure, and an amount of a second filler consisting essentially of fibers effective to enhance the rigidity of the structure and reduce crack propagation therein. An optional third filler consisting essentially of plastic microspheres may be added in an amount effective to reduce the weight of the panel by at least 10% without significantly affecting the other essential properties of the cross-linked resin and first and second fillers, namely flexural strength, flame resistance, impact resistance, rigidity, resistance to crack propagation, and resistance to outdoor environments, particularly marine environments. Piers and docks made from panels of the composite of the invention provide superior performance as compared to conventional materials used to build such structures."

Accordingly, a need exists for an improved methodology to extract and reuse different materials from wind turbine blades to not only address environmental concerns but also to provide beneficial products, such as, but not limited to, novel composite panels. In addition, a need exists for a tracking of such blades because as more blade manufacturers and wind farm operators use such a tracking system, there will be a greater volume of blades being recycled because the process of recycling is simpler. Moreover, providing the information to enable a steady stream of materials to recycle allows for making recycling facilities perfectly adapted to the volume of materials. Pickups of materials from wind farms are also automated using the teachings herein to save time and money.

Moreover, tracking the status of windmill blades for the example embodiments herein can be of vital importance to particular recycling facilities. Specifically, knowing details of, for example, blade creation, maintenance, and disposal time, such information can be utilized in using such blades for products of particular buyers so as to increase repeatability for those who want consistency (e.g., so as to maintain consistent ratio of glass fiber to wood) and to alert those purchasers of particular lots of discarded blades that may have provided less than desirable recycled products. The embodiments herein are directed to such a need.

BRIEF SUMMARY OF THE DISCLOSURE

The disclosure relates to products that contain composite material as well as methods of processing the material and methods of making the products. In many cases, the composite material is fiberglass or other fiber-reinforced material, including recycled fiberglass or recycled fiber-containing material. The composite material is broken down into particles that are used in forming new products. The new products may be designed to emit no volatile organic compounds (VOCs) and no hazardous air pollutants, even in cases where the composite material emits VOCs or hazardous air pollutants prior to use, as disclosed herein. The products may be designed for use in structural applications, with non-limiting examples being roads, railroad ties, traffic barriers, telephone poles and telephone pole cross bars, dock planking, sea walls, pilings, bumper stops, and posts. In other applications, the products may be for use in non-structural or decorative consumer products.

It is also to be appreciated that recycling of wind turbine material, as disclosed herein, refers to a reprocessing operation to extract and reuse desirable materials. Such materials to be reprocessed/recycled often include, but are not strictly limited to, recycled wind turbine blades (rWTB) so as to be utilized in applications, such as, for example, composite particle/fiberboard panels. As disclosed herein, the particular mechanical and physical properties of such recycled wind turbine blade (rWTB) material are thus utilized in a beneficial way so as to provide a novel reinforcement in, as one non-limiting application, composite particle/fiberboards.

Moreover, desirable mechanical (e.g., modulus of elasticity (MOE), modulus of rupture (MOR) internal bond strength (IB)) and physical (e.g., density; moisture content; water sorption (i.e., absorption and/or adsorption), thickness swelling density) properties of the products herein, (e.g., composite particle/fiberboards), can be varied in a manner to provide a desirable overall improved product with respect to similar materials on the market. Specifically, by utilizing recycled wind turbine blade (rWTB) material and by the utilization of, for example, desired resin % (MDI %), Moisture Content % (MC %) added to an existing moisture content in the material (e.g., of about 1.25%), along with other factors such as, but not limited to, additives, applied pressing pressure, and heating schedule, etc., an improved particle/fiberboard product having variable properties s provided. As a prime example, the MOE (psi) of constructed rWTB composites particle/fiberboard is almost twice that of natural-based particleboard. Moreover, thickness swelling and water absorption properties of the rWTB composites particle/fiberboard are improved upon in the manufacturing materials.

To further appreciate the improvements to conventional natural fiber-based composites, the configured resultant properties of the particle/fiberboard composites herein include, hut are not limited to, an improved flame retardancy (based on its thermal stability), less thickness swelling, and improved durability. Such resultant particle fiberboard materials can be used for substantially any number of domestic or non-domestic (industrial) applications, such as, for example, added insulation, subflooring, home constructions, mobile home decking, furniture, cabinets, pool tables, shelving, toys, signs, and wall linings, etc.

In a first aspect, the disclosure includes a method of processing composite material into smaller pieces, optionally with resin released from the material. In some cases, the composite material is fiberglass or another fiber-reinforced material, and the method produces pieces of fiber and resin and/or pieces that are a mixture of fiber and resin. In some embodiments, the small particles are used in forming new composite products as disclosed herein.

In a second aspect, the disclosure includes a method of producing products with the processed composite material produced by a method disclosed herein. In some cases, the processed material is recycled or reclaimed fiberglass or fiber-reinforced materials as disclosed herein.

In some embodiments, the methods of the disclosure may be viewed as the recycling of composite materials or raw materials that are waste or damaged beyond usefulness. In many embodiments, the composite materials are large finished products, such as boat hulls, aircraft parts and composite windmill blades as non-limiting examples. In such cases, the composite materials may be further processed, before or after use in a method disclosed herein, to remove undesirable contaminants or components.

In other embodiments, the methods of the disclosure are practiced in relation to producing composite products with recycled components. Recycled components of the disclosure include composite material, such as fiberglass or other fiber-reinforced material, that has been processed by a method disclosed herein. In many cases, the produced products emit no or low amounts of VOCs or hazardous air pollutants.

In further embodiments, the methods of the disclosure are practiced in relation to a recycling program that sets baseline waste generation amounts and provides goals and targets for reducing waste generation. The program tracks waste reduction and may report results on an annual or other basis. Waste reductions may be converted to carbon equivalents for which certification may be provided.

In an additional aspect, the disclosure includes products that contain composite material processed by a disclosed method. In many cases, the processed composite material is recycled or reclaimed fiberglass or other fiber-reinforced materials. The products may be structural or non-structural and may also have decorative aspects.

In other non-limiting embodiments, the products include additional components such as rubber, plastics, aggregate solid particulates, aggregate rock, silica, fly ash, cement, sand, and other kinds of crushed rock or gravel. In further embodiments, the products are produced by curing of processed composite material together with a resin system.

As another non-limiting aspect, a recycling method as disclosed herein of producing a composite product includes: tracking one or more composite wind turbine blades, wherein the tracking further comprises collecting and organizing information with respect to the composite wind turbine blades utilized by an energy producer; processing the tracked one or more composite wind turbine blades so as to form pieces having at least one dimension that is ½ inches or less of a resultant composite wind turbine blade material; mixing the processed resultant composite wind turbine blade material with one or more materials selected from: a resin, a water content, and one or more additives; forming the mixture of processed composite wind turbine blade material into a shape for providing a resultant composite product; and applying a pressure and a temperature to cure the formed mixture.

Another aspect of the embodiments herein is directed to a recycling method of producing a flame retardant composite product, comprising: tracking a composite wind turbine blade material throughout its chain of custody; processing the wind turbine blade material identified in the tracking step to provide a plurality of wind turbine blade (WTB) feedstock pieces that are at least one inch or less in one or more dimensions; receiving the processed wind turbine blade (WTB) feedstock pieces at a processing facility (PPF); refining the processed wind turbine blade (WTB) feedstock to provide a plurality of composite pieces ranging from about 1/16 inches up to about ½ inches in one or more dimensions; spraying the plurality of composite pieces with one or more liquids to provide a flame retardant composite mixture, wherein the one or more liquids further comprises: a Polymeric methyl-diisocyanate (MDI) resin ranging from 3% up to about 10% in content, a water content, and one or more additives; forming the flame retardant composite mixture into a shape for providing a resultant flame retardant composite product; hot pressing the formed flame retardant composite mixture at a temperature and pressure to cure the shaped composite mixture; and cutting, the cured flame retardant composite mixture to one or more dimensions in height, length and width to provide the resultant flame retardant composite product.

A further aspect of the embodiments herein is directed to a tracking method for recycling wind turbine blade materials, including; manufacturing one or more wind turbine blades; authenticating at a backend of a system that further includes: a solutions interface, a manufacturer interface, an energy producer interface, and a database, wherein authenticating further comprises providing a unique username and password; initiating a new record in a form provided at the backend, wherein the new record includes initial collected information of the one or more wind turbine blades to be tracked throughout its chain of custody; storing the initiated new record in the data base; and editing the form and thereafter storing after editing by way of the backend, wherein the editing is provided by a user of at least one of: the solutions interface, the manufacturer interface, and the energy producer interface, and wherein the editing further comprises utilizing screens at the backend to provide information selected from at least one of: blade creation, maintenance, disposal time, and any other relevant information related to the tracked one or more wind turbine blades.

Accordingly, using rWTB material for manufacturing composite particleboards is demonstrated to be an improvement over existing technologies and a beneficial solution for wind turbine blades that have reached maximum lifespan. Also, according to the results, rWTB material can be introduced to provide improved characteristics and enhanced material properties of composites to enable novel particle/fiberboard products, as disclosed herein.

BRIEF DESCRIPTION OF THE DRAWINGS

FIG. 6A, shows bar plots of MOR versus size and density results.

FIG. 6B shows bar plots of MOE versus size and density results.

FIG. 6C shows IB bar plots versus size and density results.

DETAILED DESCRIPTION OF MODES OF PRACTICING THE DISCLOSURE

General Description

Figure 1:
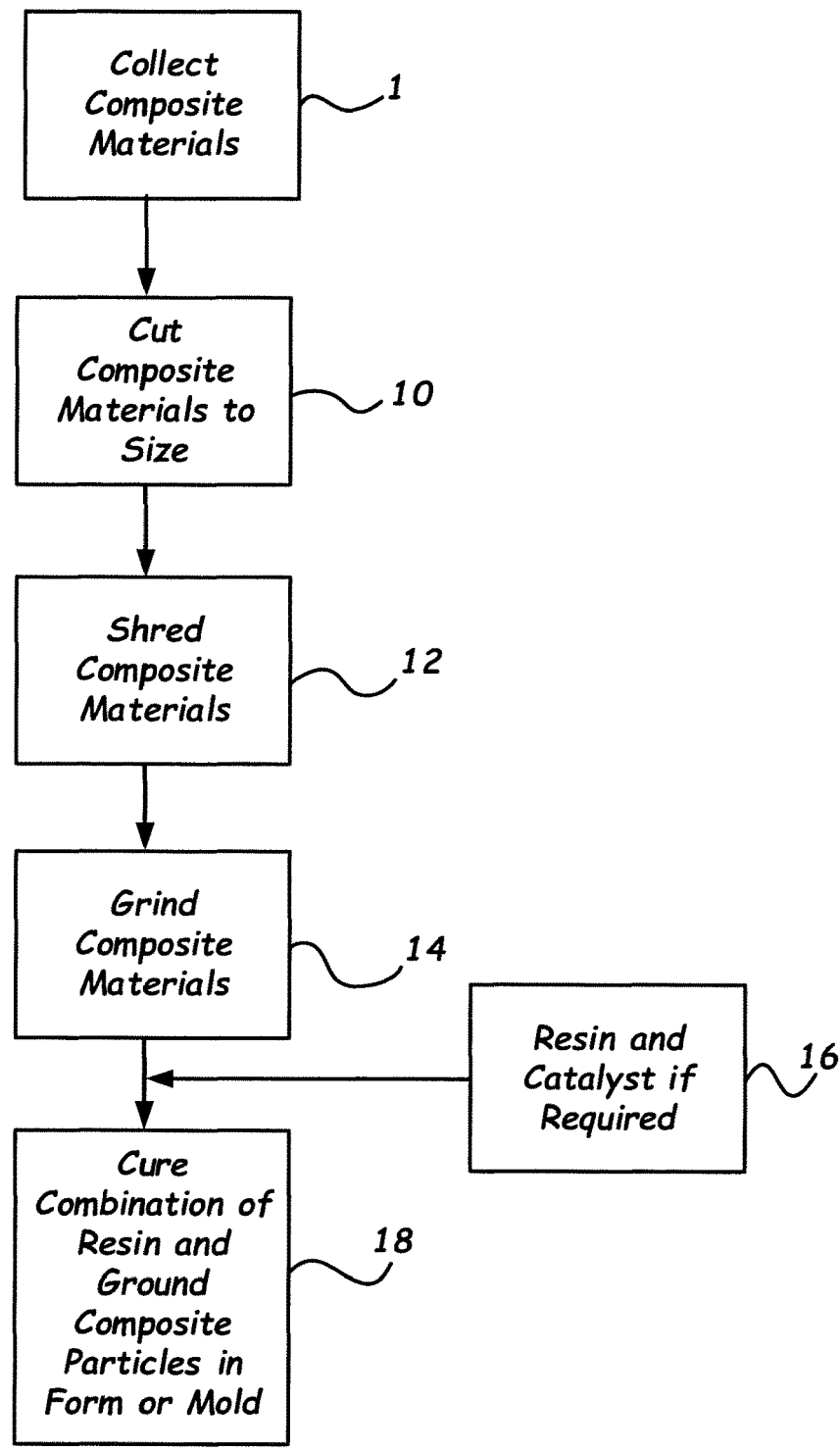
FIG. 1 is a chart illustrating a method of processing composite materials

Recycling of wind turbine material, as disclosed herein, often but not necessarily refers to a reprocessing operation to extract and reuse desirable materials. Such materials to be reprocessed/recycled often include, hut are not strictly limited to, recycled wind turbine blades (rWTB) in applications, such as, for example, composite panels. In particular, the mechanical and physical properties of such recycled wind turbine blade (rWTB) materials are thus utilized in a beneficial way so as to provide a novel reinforcement in, as one non-limiting application, composite particle/fiberboards.

It is to be appreciated that desirable mechanical (e.g., modulus of elasticity (MOE), modulus of rupture (MOR) internal bond strength (IB)) and physical (e.g., density; moisture content; water absorption and thickness swelling density) properties of the products herein, (e.g., composite particle/fiberboards), can be varied in a manner to provide a desirable overall improved product with respect to similar materials on the market. Specifically, by utilizing recycled wind turbine blade (rWTB) material and by the utilization of, for example, desired resin (MDI %), Moisture Content % (MC %) added to an existing moisture content (e.g., of about 1.25%) along with other factors such as, but not limited to, additives, applied pressing pressure, and heating schedule, etc., an improved particle/fiberboard product having variable properties is provided.

Configured properties include, but are not limited to, an improved flame retardancy (based on its thermal stability), less thickness swelling, and improved durability as demonstrated by the disclosed resultant beneficial mechanical properties herein (i.e., modulus of rupture (MOR), modulus of elasticity (MOE), and internal bond strength (IB)), as known and understood by those of ordinary skill in the art. Such resultant particle/fiberboard materials can be used for any number of domestic or non-domestic (industrial) applications, such as, for example, added insulation, subflooring, home constructions, mobile home decking, furniture, cabinets, pool tables, shelving, toys, signs, and wall linings, etc.

As disclosed herein, the superior mechanical and physical effects of using rWTB material on manufacturing the composites particleboards are provided. For example, the MOE, MOR and IB show significant enhancing in mechanical properties of the products herein, e.g., composite products (particle/fiberboards) compared to current products (natural fiber/wood-based particleboard). As an example to be shown herein, the MOE (psi) of constructed rWTB composites particle/fiberboard is almost twice that of natural fiber-based particleboard. Moreover, thickness swelling and water absorption properties of the rWTB composites particle/fiberboard are improved upon in the manufacturing materials.

Accordingly, the obtained results indicate that using rWTB material for manufacturing composite particleboards is one of the best solutions for the wind turbine blades that have reached maximum lifespan. Also, according to the results, rWTB material can improve characteristics and material properties of the resultant particle/fiberboard composites herein.

Specific Description

In the description of the invention herein, it is understood that a word appearing in the singular encompasses its plural counterpart, and a word appearing in the plural encompasses its singular counterpart, unless implicitly or explicitly understood or stated otherwise. Furthermore, it is understood that for any given component or embodiment described herein, any of the possible candidates or alternatives listed for that component may generally be used individually or in combination with one another, unless implicitly or explicitly understood or stated otherwise. Moreover, it is to be appreciated that the figures, as shown herein, are not necessarily drawn to scale, wherein some of the elements may be drawn merely for clarity of the invention. Also, reference numerals may be repeated among the various figures to show corresponding or analogous elements. Additionally, it will be understood that any list of such candidates or alternatives is merely illustrative, not limiting, unless implicitly or explicitly understood or stated otherwise. In addition, unless otherwise indicated, numbers expressing quantities of ingredients, constituents, reaction conditions and so forth used in the specification and claims are to be understood as being modified by the term "about."

Accordingly, unless indicated to the contrary, the numerical parameters set forth in the specification and attached claims are approximations that may vary depending upon the desired properties sought to be obtained by the subject matter presented herein. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the subject matter presented herein are approximations, the numerical values set forth in the specific examples are reported as precisely as possible. Any numerical values, however, inherently contain certain errors necessarily resulting from the standard deviation found in their respective testing measurements.

For purposes of discussion herein, density with respect to products herein is describe in units of psi or lb/ft$^3$. The modulus of elasticity (MOE) also known as Young's modulus is a number that measures the resistance of the materials herein to elastic (recoverable) deformation under load in units of psi. The modulus of rupture (MOR) (i.e., bending strength), is a measure of a product's strength before rupture in units of psi. Internal bond strength (IB) is the tensile strength in units of psi perpendicular to the surface, i.e., measure of the internal adhesive performance of the products. Thickness swelling (in inches), is an important factor with respect to moisture effects and internal bond strength, includes swelling of the final products itself.

As described herein, the disclosure includes a method of processing, or breaking down, a composite material for subsequent use, such as the production of a product as disclosed herein. In some cases, the method produces particles from a composite material or a reclaimed (or recycled) composite material. A disclosed method to break down composite material may include, as non-limiting examples, shredding or crushing, hammer milling, chopping, cutting, ripping, tearing, pounding, grinding, or otherwise degrading a composite material to form small pieces of composite material. The small pieces of composite material may then be ground to form smaller particles of composite material.

In some embodiments, a method of the disclosure is practiced with a commercial or industrial shredder and a commercial or industrial fiber-resin product grinder. In some cases, a shredder and/or grinder of the disclosure is portable such that the processing of composite material can occur on site or at the location of the material, thereby reducing transportation costs.

In many embodiments, the composite material used in a disclosed method recycles pre-existing composite products or raw materials that are waste, surplus or damaged beyond usefulness. Non-limiting examples of sources of such materials include cured or uncured scrap and ravings from fiberglass and fiber-reinforced plastic manufacturers and product manufacturers, boat hulls, and other marine equipment, composite turbine blades, including windmill blades, and aircraft parts. In many cases, the input materials are fiber-reinforced materials formed from polyester and styrene resin. Non-limiting examples of fiber materials include fiberglass, graphite, carbon, nylon, and KEVLAR® and other synthetic fibers.

In some cases, the composite material is too large to fit into the shredder or grinder. Therefore, the methods of the disclosure may include crushing, cutting, chopping, ripping, tearing or otherwise reducing large pieces of composite material to a size and shape that fits into a commercial or industrial shredder, crusher, chopper or grinder. Cutting or crushing processes or procedures are known in the art to reduce the size of the composite materials, including those processes and procedures that require air permits from the Environmental Protection Agency (EPA) for indoor or outdoor operation.

In some embodiments, composite materials are sorted for size and content prior to processing as disclosed herein. The composite materials may also be cleaned before processing with appropriate solvents or cleaners before, or during the breakdown process. In some cases, the cleaning occurs before shredding. In many embodiments, the composite materials include additional components that are undesirable for inclusion in new composite products, or foreign material has been combined with the composite materials. Non-limiting examples of such contaminants include wood products, and ferrous and non-ferrous metals. In such cases, additional processing of the composite materials may be performed to remove the contaminant(s). Non-limiting examples of additional processing include exposure of composite materials to a magnet or magnetic surface to attract and remove select metal contaminants. Such magnets may be part of a conveyance system such as a vibratory conveyor. By way of another example, pieces or particles of composite material may be placed in a rotational device such as a centrifuge or cyclone and spun at high revolutions so that heavier objects such as pieces of metal or stone are separated from the lighter pieces or particles of composite material. Of course, multiple separation processes may be performed in relation to each of the acts in a method of the disclosure. In many cases, any metal collected from these and other separation processes known in the art may also be recycled.

The disclosure also includes methods such as the grinding of small pieces of composite material into smaller particles of composite materials. Optionally, the particles, which may comprise both fiber and resin, need not be separated into fiber and resin components as disclosed in U.S. Pat. No. 5,569,424, which is hereby incorporated by reference as if fully set forth. The particles may be further used to form a solid composite product as disclosed herein. As a non-limiting example, the particles may be combined with a resin system to produce a solid, fiber-reinforced composite product. In other cases, the particles may be combined with other dry binders, fillers, reinforcements, or strengthening agents to produce a dry mixture product. In further instances, the particles may be used as an additive or as a strengthening matrix to increase product life, strength, and/or durability of an enhanced product. Non-limiting examples of an enhanced product include plastic resins, resin castings, casings, fiber-board, traffic barriers, railroad ties, planking, concrete, rubber and wood composite products.

In many embodiments, the small pieces to be ground down are no greater than about three inches in diameter. In other embodiments, the pieces of the invention are not greater than about 2.5 inches, not greater than about two inches, or not greater than about 1.5 inches in diameter. In some embodiments, the pieces are less than about one inch to about three inches in diameter. As used throughout this disclosure, the term "about" followed by a numerical value indicates a range that includes the numerical value and values that are from ten (10) percent greater than to ten (10) percent less than the numerical value.

In other embodiments, the small pieces may be in the shape or form of rods, strips, cubes, rectangular prisms, cylinders, or irregular shapes, wherein the width or length of the shape is less than about 24 inches. In other embodiments, the pieces have a width or length less than about 18 inches, less than about 12 inches, less than about 10 inches, less than about 8 inches, less than about 6 inches, less than about 4 inches or less than about 2 inches.

In many embodiments, the disclosed grinding process produces particles with an average fiber length of about one inch or less. In other embodiments, the particles have an average fiber length of about one-half inch or less, about one-quarter inch or less, or about one-eighth inch or less. In some embodiments, the particles of the invention have an average fiber length from about one-half inch to about one-eighth inch, or about one-half to about one-quarter inch, or about one-quarter to about one-eighth inch.

As described herein, a method of the disclosure comprises making or forming solid composite products with particles of composite material. The composite material may be "recycled" material produced by the break down process disclosed herein. The disclosure thus includes a method of processing a composite material as described herein to form particles of composite material that are then used to produce a solid composite product. In some embodiments, the method includes shredding, crushing and/or grinding a composite material, such as a reclaimed material, into particles, combining the particles with resin to form a mixture, disposing the mixture into a form or a mold, and curing the mixture to form a solid composite product.

Of course particles produced in accordance with the disclosure may be stored separately or in mixture with one or more agent. Non-limiting examples of agents include dry binders, fillers, catalysts, reinforcements, and strengthening agents suitable for use in forming a composite product. As a non-limiting example, the ground composite material (particles) may be combined with aggregate rock and/or silica and stored until use in production or manufacture of a composite product.

In some embodiments, the resin may require a catalyst for operation. In other cases, the resin does not require a catalyst. In some cases, the resin may require applied heat and/or pressure to cure, while in other cases the resin may be cured at room temperature. In yet other cases, the resins may also have been recycled from pre-existing materials. Non-limiting examples of resins include flowable plastic, polymer, epoxy, saturated and unsaturated non-styrenated polyester, and vinyl ester resins. In some cases, use of a styrene-free polyester resin will reduce or eliminate the outgassing of VOCs or hazardous air pollutants from the cured solid composite product.

As disclosed, a method of the disclosure may include curing the mixture of resin and particles, with or without the addition of other components and optionally without applied heat or pressure. In many cases, the mixture is disposed, placed or poured into a form or mold. In other cases, the mixture is extruded into a form or closed molding. In further cases, the mixture is poured into casts. In yet other cases, the mixture may be formed into a large block or other shape from which multiple products may be machined or otherwise formed. In other embodiments, appropriate pressures and temperatures are applied to produce the cured products.

In some embodiments, a method of producing a composite product is practiced with one or more additional components in forming a solid composite product. Non-limiting examples of components in a particle-resin mixture include binders, fillers, resins, catalysts, reinforcements, and strengthening agents. Additional non-limiting examples of components include aggregate solid particulates, aggregate rock, gravel, sand, wood, textiles, pipes, rods, bars, fibers, metals, honeycombs, spacers, tillers, resin, recycled resin, plastic resin, catalysts, recycled polymers, paper fibers, binders, cement, magnesium oxide, water, cement, limestone, granite, chemical additives, and combinations thereof. In some cases, an additional component is mixed into the resin-particle mixture. In other cases, a component is disposed or placed into the form, mold, cast or the like prior to the addition of the mixture. In yet other cases, the component is disposed or placed into the form, mold, cast or the like after the addition of the mixture.

The disclosure further includes a method of combining composite particles with binders, tillers or other reinforcement materials, optionally mixing the combination with resin, optionally disposing the mixture in a mold and optionally curing the mixture.

As disclosed herein, a cured composite product comprises resin and particles of composite, optionally fiber-reinforced, material. In many cases, the products may also include additional components such as aggregate rock, gravel, sand, wood, textiles, pipes, rods, bars, fibers, metals, honeycombs, spacers, fillers, resin, recycled resin, plastic resin, catalysts, recycled polymers, paper fibers, binders, cement, magnesium oxide, water, cement, limestone, granite, chemical additives, and combinations thereof.

As described, a composite product of the disclosure comprises resin and particles of composite material. In some cases, the particles of composite material form no more than about 50% by weight of the cured product. In other cases, the particles form no more than about 40%, about 30%, about 25%, about 20%, about 15%, about 10% or about 5% by weight of the cured product. Alternatively, in some cases the resin comprises less than about 50%, about 40%, about 30%, about 25%, about 20%, about 15% or about 10% of the weight of the cured product.

In other embodiments, a composite product of the disclosure comprises resin, particles of composite material and aggregate particulates or aggregate rock. In some cases, the particles of composite material form no more than about 50% by weight of the cured product. In other cases, the particles form no more than about 40%, about 30%, about 25%, about 20%, about 15%, about 10% or about 5% by weight of the cured product. In some cases the resin comprises less than about 50%, about 40%, about 30%, about 25%, about 20%, about 15% or about 10% of the weight of the cured product. In other cases, the aggregate comprises less than about 80%, about 70%, about 60%, about 50%, about 40%, about 30% or about 20% of the weight of the cured product. In yet other embodiments, the product further includes silica, which forms no more than about 40%, about 30%, about 25%; about 20%, about 15%, about 10% or about 5% by weight of the cured product.

In some embodiments, a composite product of the disclosure comprises resin, particles of composite material, silica and aggregate rock. In some cases, the ratio of these four components by weight in the cured product is about 25:15:20:40. In other cases, the ratio is about 20:20:20:40 or about 25:10:20:45.

In other embodiments, a composite product of the disclosure may withstand a compressive stress of at least about 10,000 psi with a compressive stress of less than about 7%.

In further embodiments, the weight of a product of the disclosure may increase by less than about 1% after immersion in water for 24 hours.

Having now generally provided the disclosure, the same will be more readily understood through reference to the following example which are provided by way of illustration and are not intended to be limiting of the disclosure, unless specified.

EXAMPLES

Example 1

Manufacture of Prototypes

Prototypes with dimensions of about 0.75"×1.0"×10" were produced with the following mixture:
23% resin by weight
15% ground recycled fiberglass product with ¼" fiber length
20% silica
42% aggregate rock in varying sizes The mixture was packed into a high density polyethylene molds and cured under vacuum pressure. The prototypes were machined following curing.

Example 2

Prototype Testing—Flexural Bending

A flexural bending test was performed on prototypes according tea Example 1 with the following results.

TABLE 1

|   | Width (in) | Thickness (in) | Displacement at Max Load (in) | Max Load (in) | MOE (Psi) | MOR (psi) | Specimen State |
|---|---|---|---|---|---|---|---|
| 1 | 1.000 | 0.750 | 0.180 | 175.7 | 213458 | 3012.4 | Vacuum Bagged-Smooth |
| 2 | 1.000 | 0.750 | 0.153 | 152.6 | 209347 | 2786.7 | Vacuum Bagged-Rough |
| 3 | 1.000 | 0.750 | 0.140 | 210.4 | 337081 | 3605.0 | Vacuum Bagged-Smooth/Rough |
| 4 | 1.000 | 0.750 | 0.135 | 158.7 | 217193 | 2719.8 | Hard Packed |
| 5 | 1.000 | 0.750 | 0.154 | 177.6 | 195861 | 3044.4 | Hard Packed |
| 6 | 1.000 | 0.750 | 0.118 | 130.5 | 115746 | 2236.8 | Hard Packed |
| Mean | 1.000 | 0.750 | 0.148 | 169.2 | 226448 | 2901.0 |  |
| St. Dev | 0.000 | 0.000 | 0.004 | 26.310 | 40245.683 | 450.980 |  |
| COV | 0.000 | 0.000 | 16.267 | 15.546 | 17.773 | 15.546 |  |

The modulus of elasticity (MOE) and the modulus of rupture (MOR) calculations were performed for each specimen and an average was calculated. The sample had an average MOE of 226,448 psi and a MOR of 2,901 psi.

Example 3

Prototype Testing—Compression

A compression test was performed on smaller sections of prototypes according to Example 1 with the following results.

TABLE 2

|   | Width (in) | Thickness (in) | Extension at Max Load (in) | Max Load (lbf) | Compressive stress at Maximum Load (ksi) | Compressive strain at Maximum Load (%) | Modulus (automatic youngs) (psi) |
|---|---|---|---|---|---|---|---|
| 1 | 0.996 | 0.990 | −0.050 | −11573.953 | 11.74 | 6.18 | 339340 |
| 2 | 0.955 | 0.990 | −0.045 | −11138.159 | 11.73 | 5.96 | 353341 |

TABLE 2-continued

| | Width (in) | Thickness (in) | Extension at Max Load (in) | Max Load (lbf) | Compressive stress at Maximum Load (ksi) | Compressive strain at Maximum Load (%) | Modulus (automatic youngs) (psi) |
|---|---|---|---|---|---|---|---|
| 3 | 0.904 | 0.990 | −0.053 | −10782.110 | 12.05 | 6.88 | 341853 |
| 4 | 0.944 | 0.984 | −0.043 | −10934.716 | 11.77 | 5.62 | 367608 |
| 5 | 0.885 | 0.992 | −0.044 | −9776.653 | 11.15 | 5.55 | 358623 |
| 6 | 0.943 | 0.988 | −0.054 | −105683.755 | 11.47 | 7.07 | 314801 |
| Mean | 0.938 | 0.989 | −0.048 | −10814.891 | 11.66 | 6.21 | 345928 |
| St. Dev | 0.039 | 0.003 | 0.005 | 598.539 | 0.311 | 0.638 | 18520 |
| COV | 4.179 | 0.259 | −10.061 | −5.534 | 2.667 | 10.275 | 5 |

The prototype sections performed remarkably well, averaging a maximum stress of 11,660 psi.

Example 4

Specimen Testing Water Absorption

Specimens were fully immersed in distilled water for a period of 24 hours with the following results.

TABLE 3

Water Absorption Testing

| Specimen | Initial Weight (g) | Final Weight (g) | Weight Change % |
|---|---|---|---|
| 1 | 5.3553 | 5.3974 | 0.7851 |
| 2 | 3.6210 | 3.6503 | 0.6230 |
| 3 | 3.3694 | 3.3935 | 0.6637 |
| 4 | 4.3855 | 4.4224 | 0.8414 |
| 5 | 3.7204 | 3.7517 | 0.8413 |
| Mean | 4.0903 | 4.1242 | 0.8311 |
| St. Dev. | 0.8006 | 0.8051 | 0.0290 |
| COV (%) | 19.574% | 19.547% | 3.466% |

The specimens experienced an average weight change of 0.8311%.

Example 5

Referring to FIG. 1, composite materials are collected 1 from original equipment manufacturers and other recycling sources. Composite materials are cut to size in 10 with power saws or other cutting equipment to Fit into an industrial or commercial shredder. The composite materials are shredded into pieces in 12, after which the pieces are placed in a commercial or industrial grinder in 14. The resulting composite particles are combined with resin system 16 and cured in 18 in a mold or form under applied pressure and temperature as necessary.

Example 6

Figure 2:
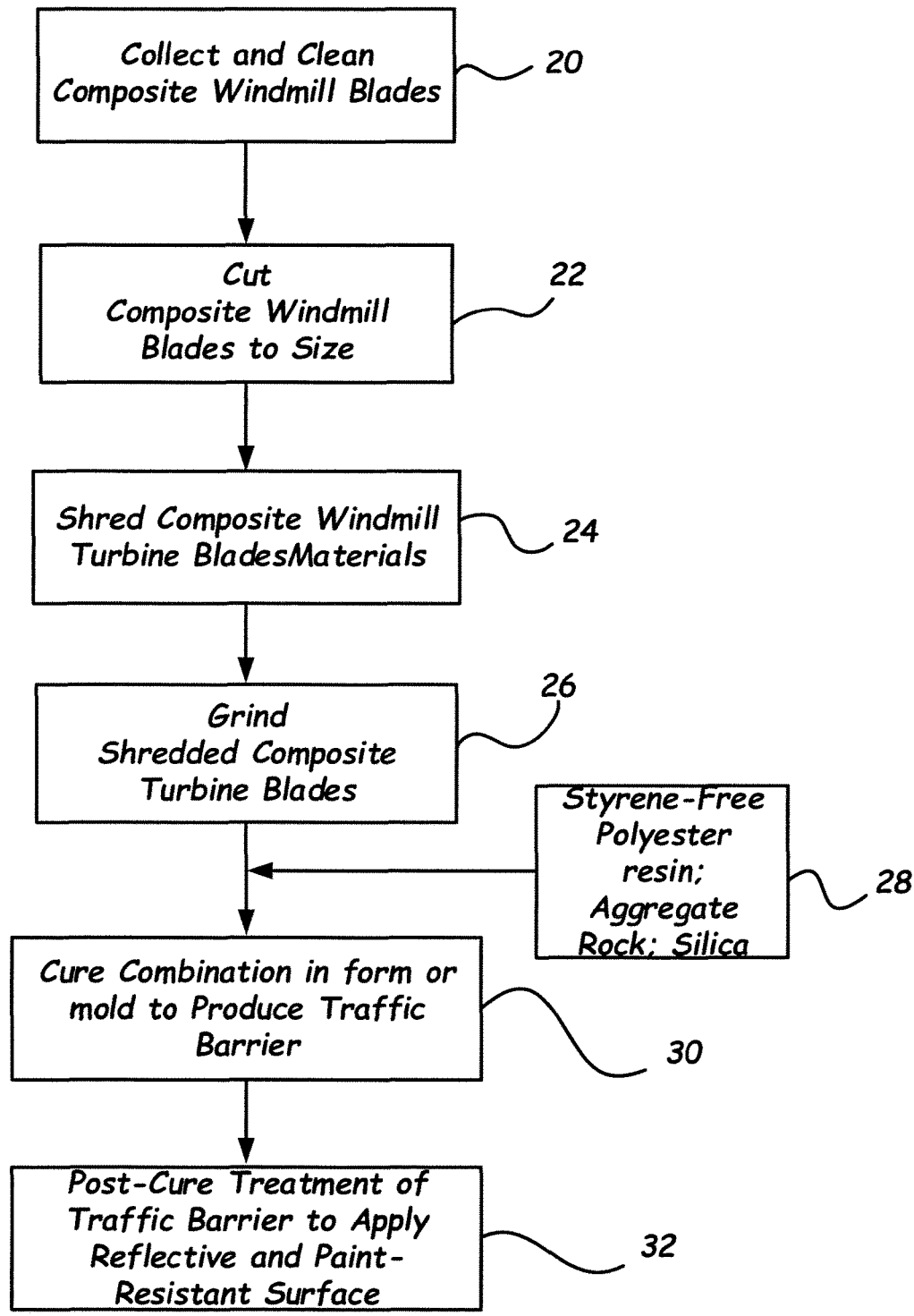
FIG. 2 is a chart illustrating a method of recycling composite materials to produce new solid composite products.

Referring to FIG. 2, a windmill composite turbine blade weighing about 22,000 pounds and about 220 feet long is collected and cleaned at 20. The blade is cut into sections each about 6.5" by 85" in height and width in 22 in order to fit into a commercial or industrial shredder. Each section is fed into a shredder of sufficient size that produces small pieces of composite material of about 1.5" to 2.5" in diameter and not more than 12" in length in 24. The resulting pieces are fed into a composite grinder at 26 using an appropriate screen size to produce ground small particles of composite material with an average fiber length of ¼ inch.

Additional tillers, binders or other reinforcement material, together with a resin system, are introduced at 28. The fillers are aggregate rock and silica, and the resin is styrene-free polyester resin. The combined mixture is packed into a form or mold and cured to produce a traffic barrier in 30. The traffic barrier is treated with finishes that are reflective and/or resist graffiti paints in 32.

Example 7

Ground small particles of composite material with an average fiber length of ¼ inch is combined with aggregate rock, silica and styrene-free polyester resin in a ratio of 42:20:15:23 and thoroughly mixed. The mixture is poured into a railroad tie mold in which a 4.5" diameter PVC pipe has been placed. The mixture is poured around and enrobes the pipe. The composite is cured at room temperature. The resulting railroad tie withstands a minimum of 10,000 psi with less than 7% compressive strain.

Example 8

Figure 3:
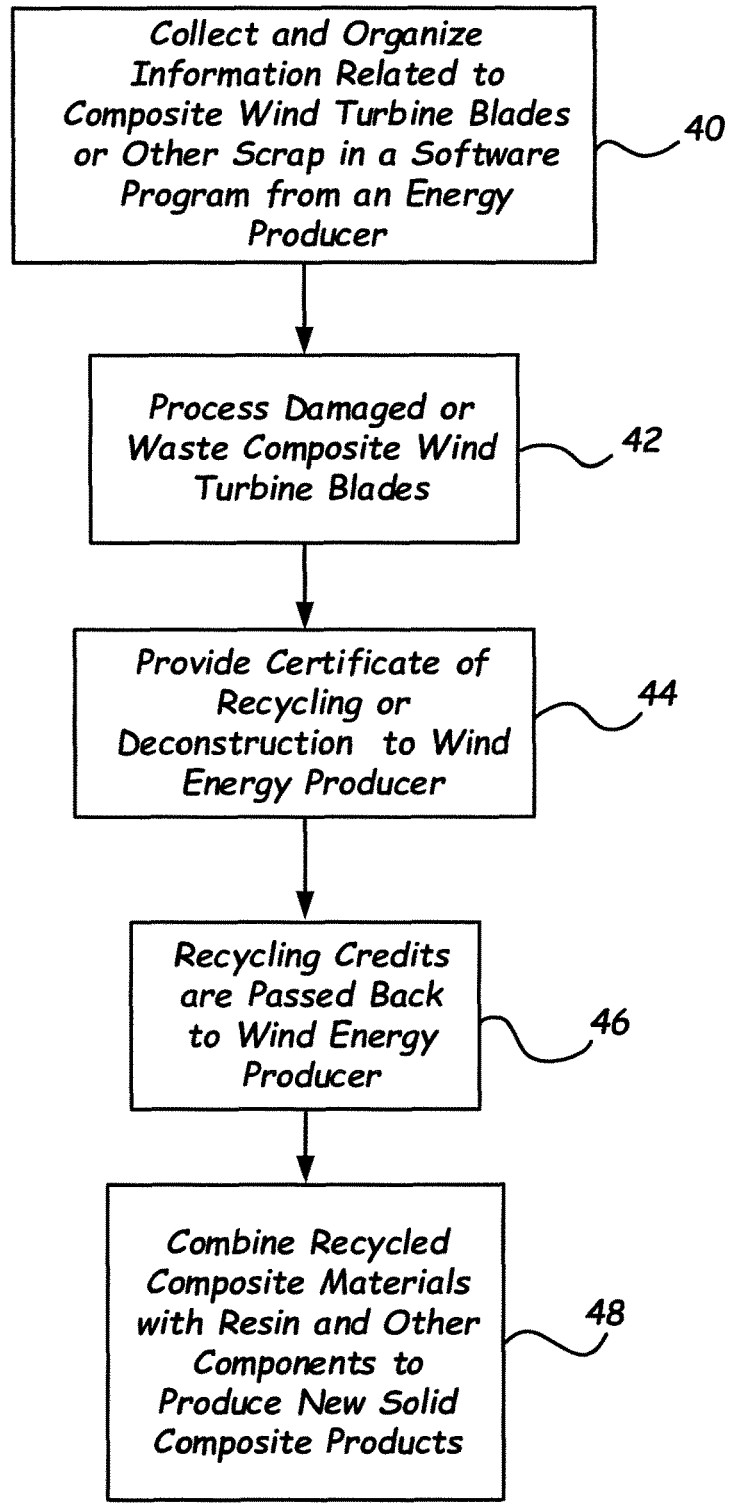
FIG. 3 is a chart illustrating a method of processing composite materials in parallel with processing of recycling or carbon credits.

Referring to FIG. 3, a system for processing composite materials for recycling and tracking and applying recycling credits includes for example in 40 collecting and organizing information relating to composite products, such as wind turbine blades, or other scrap parts, in a software program tailored to the needs of a wind energy producer. The damaged or scrap parts are processed according to the methods of the disclosure in 42. The processor or recycler provides a certificate of recycling, or a certificate of deconstruction, to the wind energy producer in 44. The processor or recycler, or their agents, may further collect and pass back to the energy producer the recycling credits in 46. The processor or recycler combines the recycled composite materials with resin and optionally other components to produce new solid composite products.

Example 9

Particle/Fiberboard Prototype and Materials and Fabrication Methodology

Referring to FIG. 3, wind turbine composite material information is collected and organized 40 (e.g., tracked) from manufactures and/or wind energy producers (wind energy farms) using the aforementioned software program discussed above in Example 8 and as to be discussed in more detail below. The teachings for how a reduction to practice came about are discussed as follows.

Using the tracking system/software program disclosed herein, a wind turbine blade was identified and was provided from a wind energy producer. The blade was cut out from a load carrying beam configured with approximate dimensions of about 5 cm in width, about 5 cm in length and with an existing moisture content (MC) of about 1.25%.

The blade was thereafter collected 1 (see FIG. 1) and processed/shredded 12 (i.e., cut, shredded (see reference characters 1, 10, 12 in FIG. 2; 22, 24, 26 in FIG. 2; and/or 42 in FIG. 3)) using known machinery to palm size. The resultant composite material was thereafter shipped to the Composites Materials and Engineering Center at Washington State University. While such material was configured to working dimensions by the Wind Energy producer, it is to be appreciated that such reduction to smaller sizes can also be configured at any site of choice.

The received material was then hammer milled through ½", ¼", ⅛", 1/16" screen sizes. It is to be appreciated that the term 'hammer milled' for this particular reduction to practice refers to smashing material into smaller and smaller pieces until the pieces can pass through a particular screen. While a hammer mill (e.g., a Bliss hammer mill) is a beneficial means, it is also to be appreciated that there are other means to achieve desired sizes, as known and understood by those of ordinary skill in the art. For example, a Hog mill, which has chisel-like striking elements to break the rWTB pieces against a breaking plate can also be used to provide the desired reduced-in-size materials.

Moreover, it is also to be appreciated that other means (e.g., conventional mills which have been available in the open market) for providing desired sizes can also be utilized and passed through a particular screen to equally achieve desired sizes when appropriate, as understood by those of ordinary skill in the art.

To manufacture the new composites disclosed herein, (i.e., particle/fiberboards), Polymeric methyl-diisocyanate (Rubinate 1840) (pMDI) was chosen as an exemplary resin but this does not exclude other resins that can be utilized to provide the beneficial properties of the resultant panicle/fiberboards products disclosed herein. It is to be noted that MDI is beneficially formaldehyde free (thus resultant composites are formaldehyde free) and it polymerizes in the presence of water and thus in combination, reduces ecological risk concerns with respect to the product(s) itself. However, it is also to be appreciated that the use of the disclosed % range of pMDI, because of its capability of forming desired chemical and mechanical bonds (i.e., highly reactive and has strong bondability), is a preferred resin as it surprisingly and unexpectedly, contributes to the superior mechanical and physical properties of the resultant products disclosed herein.

In order to obtain comprehensive mechanical and physical properties of desirable rWTB composite particle/fiberboards, first, the effects of using different resin content, moister content and particle size on the material properties of manufactured composites were analyzed. Then, effects of density and using smaller particle size on the characteristics of rWTB composites particleboards were also evaluated so that such information can be used to provide the novel methods and composite particle/fiberboards disclosed herein. For achieving this purpose so as to enable the improved embodiments herein, eleven rWTB flame retardant composite particle/fiberboards were manufactured after analysis according to Table 4 as follows.

TABLE 4

| Sample | Resin Content (%) | MC (%) | Particle Size (inch) | Density |
|---|---|---|---|---|
| 1 | 6 | 5 | ⅛ | 65 |
| 2 | 6 | 5 | ¼ | 65 |
| 3 | 6 | 5 | ½ | 65 |
| 4 | 3 | 5 | ½ | 65 |
| 5 | 10 | 5 | ½ | 65 |
| 6 | 6 | 3 | ½ | 65 |
| 7 | 6 | 8 | ½ | 65 |
| 8 | 6 | 5 | ⅛ | 65 |
| 9 | 6 | 5 | ⅛ | 70 |
| 10 | 6 | 5 | ⅛ | 75 |
| 11 | 6 | 5 | 1/16 | 65 |

Table 4 above thus shows the detailed experimental plan. For investigating the effects of resin content on the material properties of rWTB composites particleboards, by considering a constant particle size, pMDI resin was sprayed into rWTB material with the levels of 3%, 6%, and 10% (see under heading of "Resin Content" and as denoted by grey shaded region), respectively. Three MC levels (3%, 5%, and 8%, see under heading of "MC %") and as denoted by grey shaded region) were also adjusted by spraying water after spraying of pMDI resin.

At the second step, for considering the effect of density (mass per unit volume or area (e.g., units of $lb/ft^3$, psi) on the material properties of the manufactured particle/fiberboards, pMDI resin was sprayed into rWTB material with a constant level of 6%. After spraying pMDI resin, water was sprayed into rWTB material at the constant level of 5%, three density levels were considered (65, 70 and 75, see under heading of "Density" as also denoted by grey shaded region).

In order to manufacture composite particle/fiberboards with different content, the resinated and moisturized rWTB was then hot pressed to a size of about a 14×14 inch particleboard with a thickness of 0.3 inches. The hot press temperature and time were set as 138° C. and 5 minutes, accordingly, which is often as disclosed herein for illustrative purposes, but not always, a heating schedule for pMDI curing. Finally, after finishing the hot press process (see for example 42 in FIG. 3), eleven composite particle/fiberboards were cut from manufactured composite panels.

For evaluating the material properties of rWTB composite particleboards, both the mechanical and physical properties of manufactured composite particleboard were investigated. Prior to testing, composite particleboards were kept in the conditioning room for 24 hours. Mechanical and physical tests were based on ASTM D1037-12 and compared with ANSI 208.1-2009. Statistical analysis was based on analysis variance (ANOVA), Tukey comparison, as known to those skilled in the art.

Mechanical Properties: Flexural and IB

The IB test determined cohesion/adhesiveness of the panel in the direction perpendicular to the plane of the panel. The test specimens were 2 inches square and the thickness was 0.3 inches. The flexural properties were measured in three points bending test at room temperature. The tests were performed in accordance with ASTM D 1037-12. The bending test determined the flexural properties, (e.g., the modulus of elasticity MOE, modulus of rupture (MOR), as briefly discussed above. The span for the test was 24 times the nominal thickness of the specimen. The load was applied at the center of the span to the top surface. Moreover, the load was applied continuously during the test at the uniform rate of motion of the crosshead of the testing machine.

Physical Properties: Water Absorption and Thickness Swelling

Water absorption tests were performed in accordance with ASTM D 1037-12. The conditioned specimens were immersed in water for 2 hours and 24 hours at the temperature of 23±2 C. After 2 hours, the specimens were removed from the water and all surface water was wiped off with a cloth, and then were weighted. After 24 hours of immersion this process repeated again. The percentage increase in weight (w) during immersion was calculated as follows:

$$w(\%) = \frac{m_t - m_0}{m_0} \times 100$$

wherein $m_0$ and $m_t$ are the conditioned and wet weights respectively.

Evaluating the thickness swelling is also similar to the water absorption. For evaluating the thickness swelling, the average thickness swelling included the average of five points wherein four points at four corners of particleboard were considered with the fifth at the center.

Thermogravimetric Analysis (TGA)

Figure 4:
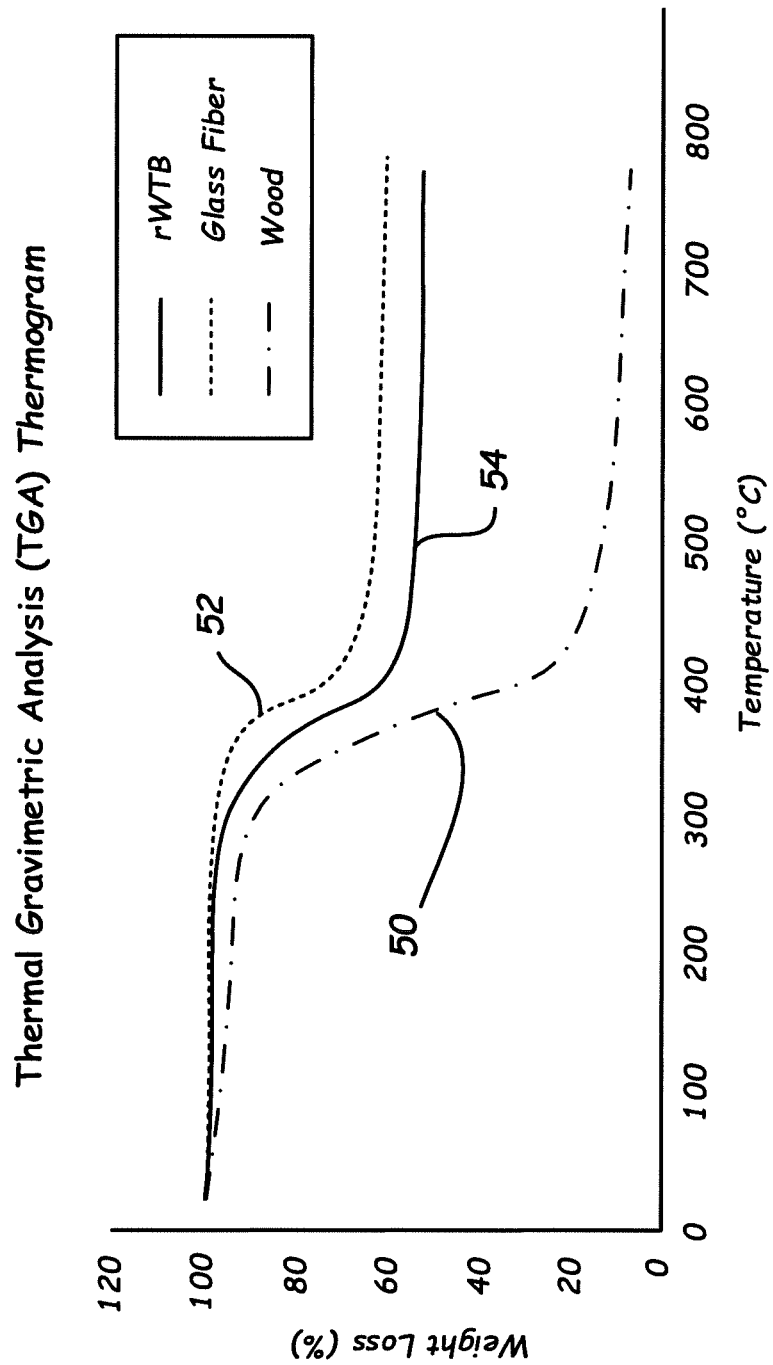
FIG. 4 shows TGA curves for recyclable wind turbine (rWTB) material, pure glass fiber and pure wood for comparison for up to 800 C under nitrogen at the heating rate of 20° C. min⁻.

FIG. 4 shows TGA curves recorded in nitrogen at a heating rate of 20° C. min$^{-1}$. In particular, TGA was carried out by heating the rWTB material as well as pure glass fiber and pure wood for comparison, up to 800° C. under nitrogen at the heating rate of 20° C. min$^{-1}$. The thermal degradation profiles of wood, glass fiber and rWTB material by TGA revealed that most of the degradation events occur between 300° C. and 500° C. In particular, the glass fiber (see dashed curve 52) degrades over the 350° C. temperature, the rWTB (see curve 54 denoted by a solid line) material starts to degrade at the lower temperature level than glass fiber, around 200° C., and wood (see curve 50) starts to degrade over a much lower temperature range, around 50° C. The degradation before 200° C. is almost for steam-explosion and water extraction. The TGA results indicate that 48% of the total loss was contributed to thermoset resin, inserted wood material, and coating in the wind turbine blade 54 material, wherein 60% residue was assigned as the loss content for glass fiber 52. Because the wood 54 analysis revealed a larger shoulder region, such a result indicated that the wood 50 material loses 95% of its original weight. An important take-away from the curves shown in FIG. 4 is that the TGA results beneficially show that the rWTB material 54 has very good thermal stability, as shown by the higher starting decomposition temperature of about 250° C. in contrast to glass fiber 52 at about 200° C., and wood 50 at about 50° C.

Mechanical Properties of rWTB Composites

For evaluating the mechanical properties of rWTB composites, a three points bending test (flexure test to provide, for example, modulus of elasticity) and an internal bond (IB) test (to determine adhesive effectiveness in correlation with other variables such as particle size and density of the composite were used.

Figure 5A:
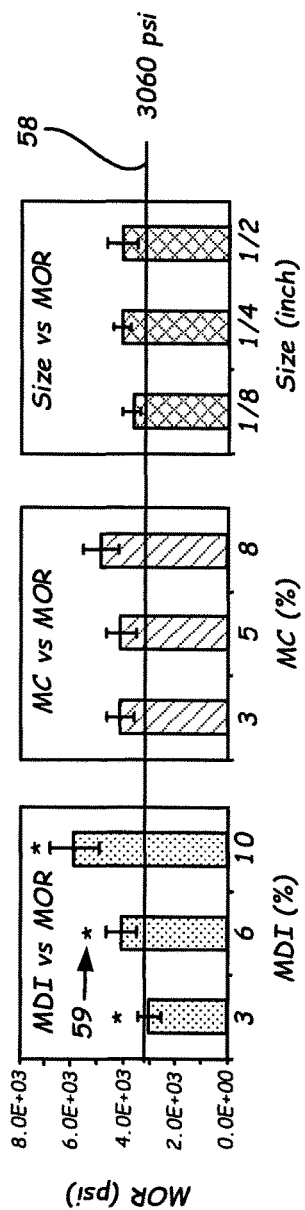
FIG. 5A shows bar plots of modulus of rupture (MOR) versus resin (i.e., MDI %), moisture content *MC (%)) and size (inch) results.
Figure 5B:
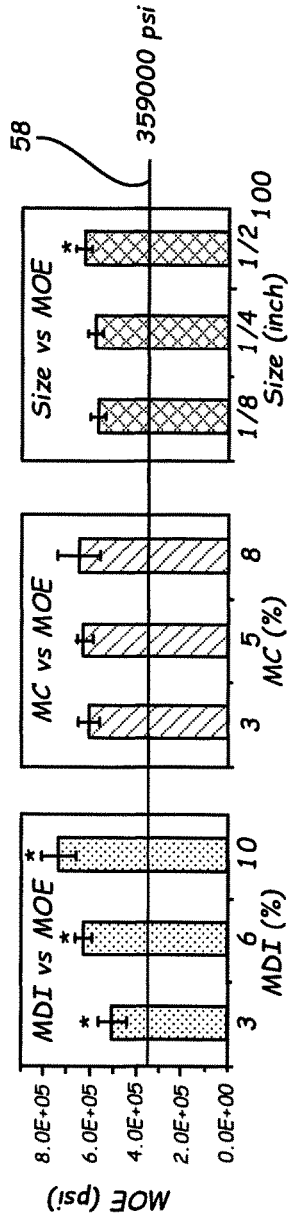
FIG. 5B shows bar plots of MOE versus MDI (%), MC (%) and size (inch) results.
Figure 5C:
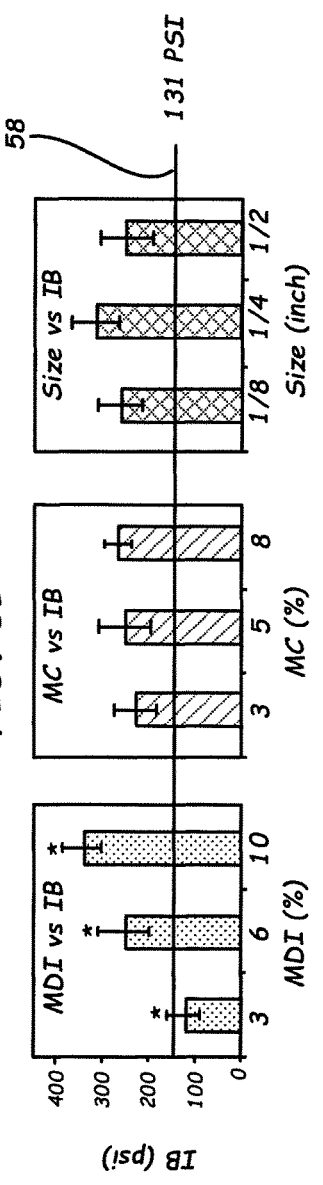
FIG. 5C shows bar plots of internal strength (IB) versus MDI (%), MC (%) and size (inch) results.

Thus, FIGS. 5A-5C show mechanical properties of rWTB composites particleboards considering MDI (%), MC (%) and particle size effects in particular. Specifically, FIG. 5A shows MOR versus MDI (%), MC (%) and size (inch) results, FIG. 5B shows MOE versus MDI (%), MC (%) and size (inch) results, and FIG. 5C shows IB versus MDI (%), MC (%) and size (inch) results. Note that in FIG. 5C, the lowest IB is at least about 100 psi. The lines denoted by the reference character 58 in FIGS. 5A-5C indicate the requirements of the highest grade according to ANSi 208.1-2009, which is the standard set forth for the requirements and test methods for dimensional tolerances, as well as physical and mechanical properties for composite board. The indicated asterisks 59 in the figures (only one denoted in FIG. 5A for simplicity) is used for significant differences based on ANOVA analysis, i.e., models used to analyze the differences among group means and their associated procedures.

FIGS. 6A-6C show results of mechanical properties of rWTB composites particleboards considering density effects. Specifically, FIG. 6A, shows MOR versus size and density results, FIG. 6B shows MOE versus size and density results, and FIG. 6C IB versus size and density results.

Figure 7:
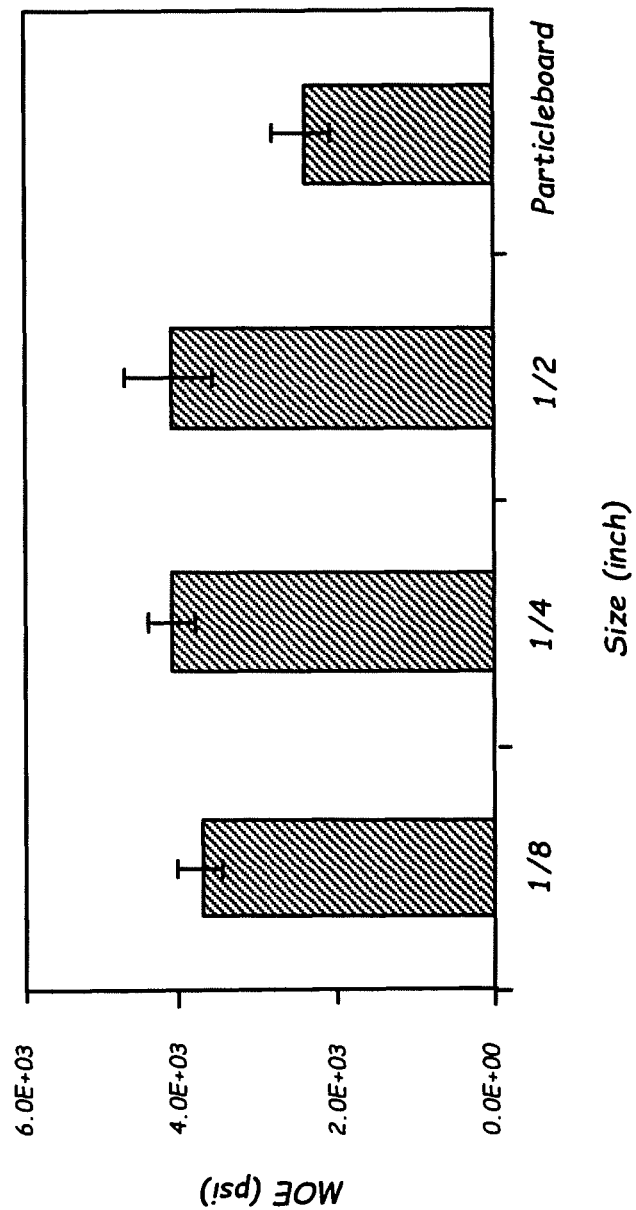
FIG. 7 shows bar plots of the modulus of elasticity (MOE) of different particle sizes of configured recyclable wind turbine (rWTB) material oldie present embodiments so as to show the improvements thereof as compared to conventional natural fiber-based particleboards.

FIG. 7 is finally shown comparing MOE of different particle size rWTB composites particle/fiberboards in contrast to a conventional wood based particleboard. Accordingly, FIG. 7 shows the MOE disparity of conventional natural fiber-based composite boards as compared to the particle/fiberboards MOE improvement of the present embodiments. The plots also show that similar to the MOR results, the trend, as to be discussed in more detail below, is that reducing the particle size also reduces the MOE.

According to the obtained surprising and unexpected results, resin content (i.e., MDI %) provides superior properties compared to conventional materials with respect to MOE, MOR as well as IB. However, the results also indicate that MC % may not have a significant influence on the mechanical properties for MOR, MOE, and IB. Importantly, rWTB composites particleboard with 10 MDI %, 5% MC and ½" particle size had the maximum amount of MOE (i.e., 7.41E+5 psi) and the rWTB particleboard with 1/16" particle size, 6 MDI % and 5 MC % has the minimum amount of MOE equal to about 3E+5 psi.

In addition, just like MOE, rWTB composites ½ inch particle/fiberboard with 10 MDI % and 5 MC % had the maximum amount for both of the MOR and IB, i.e., 5.914E+5 psi and 34 psi respectively. The rWTB composites particleboard with 1/16 inch particle size has the minimum amount of MOR (2.290E+3 psi) and particle/fiberboard with 3 MDI %, 5 MC % and inch particle size has the minimum amount of IB equal to 119 psi. Lastly, IB tests show that the best result is for ¼ inch particle size and similar to the MOE and MOR, 1/16 inch particle size has minimal effect for IB test results as compared to the bigger particle sizes.

Also according to the obtained results, particle size also does not have a significant effect on the mechanical properties. Four particle sizes of ½", ¼", ⅛" and 1/16" were used. The results of MOE indicate that there is no considerable difference among ½", ¼", and ⅛" in particle size, by reducing the particle size to 1/16, MOE reduced more.

Thickness Swelling

Figure 8A:
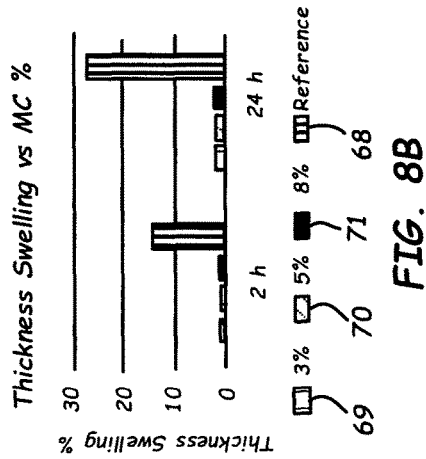
FIG. 8A shows a comparison of thickness swelling of recyclable wind turbine (rWTB) particle fiberboards versus MDI % over 2 hours and 4 hours of immersion.
Figure 8B:
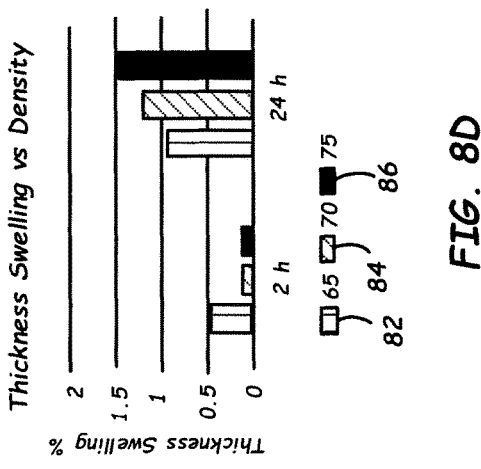
FIG. 8B shows a comparison of thickness swelling of recyclable wind turbine (rWTB) particle/fiberboards versus MC % over 2 hours and 4 hours of immersion.
Figure 8C:
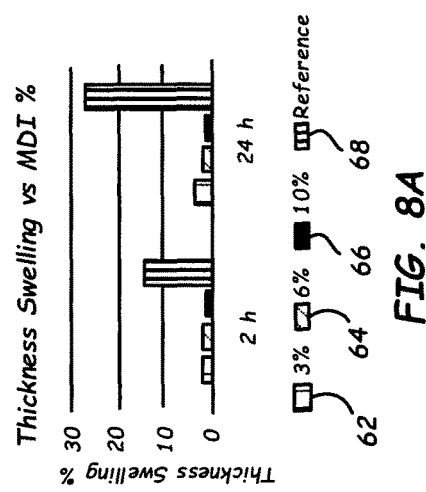
FIG. 8C shows a comparison of thickness swelling of recyclable wind turbine (rWTB) particle; fiberboards versus particle size over 2 hours and 4 hours of immersion.
Figure 8D:
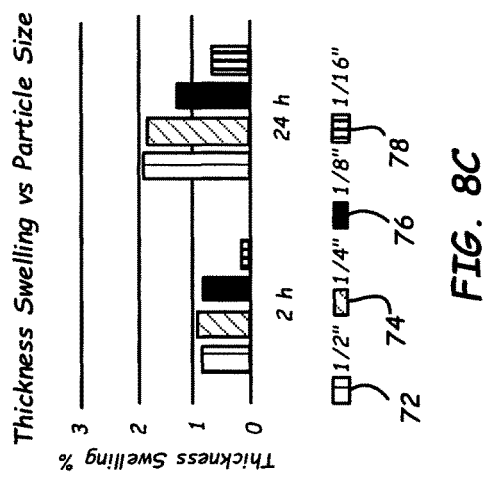
FIG. 8D shows a comparison of thickness swelling of recyclable wind turbine (rWTB) particle/fiberboards versus density over 2 hours and 4 hours of immersion.

Results of thickness swelling are given in FIG. 8A, FIG. 8B, FIG. 8C and FIG. 8D, comparing the results of thickness swelling for rWTB particle/fiberboards of the present embodiments herein. In particular, FIG. 8A shows thickness swelling versus MDI %, FIG. 8B shows thickness swelling versus MC percentage, FIG. 8C shows Thickness swelling versus particle size, and FIG. 8D shows thickness swelling versus density. FIG. 8A and FIG. 8B thus show MDI resin % and MC % being varied while under 2 hours and 24 hours of immersion respectively for particle/fiberboards disclosed herein. The MDI %'s shown in FIG. 8A includes 3 MDI % 62, 6 MDI % 64, 10 MDI % 66 compared against a natural fiber-based particleboard reference 68 (configured with 4% MDI, 10% MC wheat straw) while under 2 hours and 24 hours of immersion.

The MC %'s shown in FIG. 8B includes 3 MC % 69, 6 MC % 70, and 10 MC % 71 compared against a natural fiber-based particleboard reference 68 (configured with 4% MDI, 10% MC wheat straw) while under 2 hours and 24 hours of immersion. With respect to FIG. 8C and FIG. 8D, the variables for those plots include particle sizes (FIG. 8C) ½" 72, ¼" 74, ⅛" 76, ¹⁄₁₆" 78, and the variables for density (see FIG. 8D) include 65 lb/ft$^3$ 82, 70 lb/ft$^3$ 84, and 75 lb/ft$^3$ 86, also while under 2 hours and 24 hours of immersion.

Accordingly, thickness swelling for rWTB particle/fiberboards as compared with natural fiber-based particleboard (i.e., reference 68) shows distinct improved characteristics of rWTB particle/fiberboards. The maximum amount of thickness swelling of rWTB particle/fiberboards (particle size=½" 72, MD=3% 62, MC=5(%)) after 2 hours of immersion is 1.96(%) and thickness swelling for the control sample after 2 hours is 14.6(%).

Such a result indicates that the maximum thickness swelling of particle/fiberboards disclosed herein is 13% of natural fiber-based particleboard. Also, after 24 hours of immersion, the maximum thickness swelling of rWTB particle/fiberboards is equal to about 3.69% and the thickness swelling of natural fiber-based particleboard after 24 h of immersion is about 27.3 This result indicates that after 24 hours of immersion, the maximum thickness swelling of rWTB composite particle fiberboards disclosed herein is 13.5% or less of a natural fiber-based particleboard 68.

The best result of thickness swelling after 2 hours of immersion is for particle/fiberboards with particle size=⅛" 76 and density=70 lb/ft$^3$ 84 (MDI=6% and MC=5%). In particular, the thickness swelling after 2 hours of immersion is equal to about 0.11(%) and after 24 hours of immersion the rWTB particleboard with ¹⁄₁₆" 78 particle size and 65 lb/ft$^3$ 82 has the minimum amount of swelling equal to 0.71%. In comparing the results of rWTB particle/fiberboards with the natural fiber-based particleboard 68, thickness swelling of these two particular particle fiberboards is 0.75% and 2.6% of natural fiber-based particleboard respectively.

With respect to MDI (%) (e.g., see FIG. 8A), after 24 hours of immersion, by increasing the amount of MDI (%) from 3% to 10% thickness swelling reduced from 3.69% to 1.88%. Therefore, such a result indicates that MDI % has significant effect on the thickness swelling of rWTB composites particle fiberboards. Evaluating the effect of MC % (e.g., see FIG. 8B), the results indicate that after 24 hours of immersion, by increasing the amount of MC %, thickness swelling increased, and there is no considerable difference between the thickness swelling of rWTB particleboards with MC % of 3% and 5%. It is to be noted however that by increasing the MC % to 8% (see reference character 71 in FIG. 8B), the thickness swelling increases to some degree.

Investigating the effect of density (lb/ft$^3$) (e.g., see FIG. 8D), thickness swelling of rWTB composites particle/fiberboards disclosed herein shows that after 2 hours of immersion rWTB particleboards with particle size=⅛" and density=65 lb/ft$^3$ absorb more water compared to the rWTB particle/fiberboards with density equal to 70 lb/ft$^3$ 84 and 75 lb/ft$^3$ 86, but after 24 hours of immersion by increasing the density, thickness swelling increased significantly.

Particle size (e.g., see FIG. 8C) investigation included keeping the density (lb/ft$^3$) constant and equal to about 65 lb/ft$^3$. Results show that after 24 hours of immersion, thickness swelling reduced by reducing the particle size. Thickness swelling is 1.93% for rWTB composites particle/fiberboard with ½" 72 particle size. For the rWTB particle/fiberboard with ¹⁄₁₆" 78 particle size, thickness swelling is about 0.71%.

Physical Properties

Water Absorption

Figure 9A:
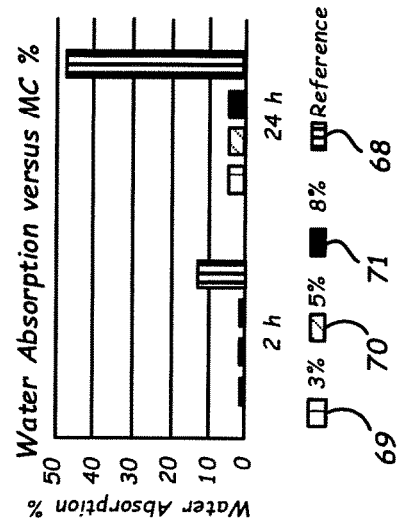
FIG. 9A shows a comparison plot of water absorption over a range of resin % (i.e., MDI %) and a reference conventional natural fiber-based composite versus MC % over 2 hours and 4 hours of immersion.
Figure 9B:
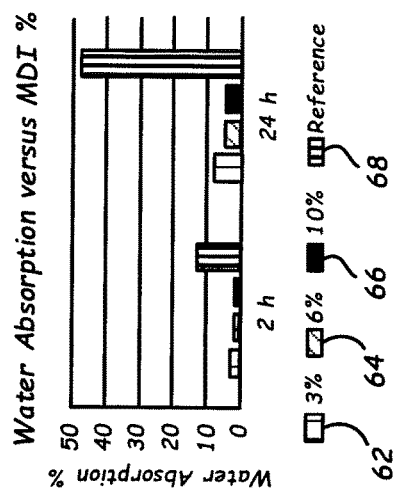
FIG. 9B shows a comparison plot of water absorption over a range of moisture content (i.e., MC %) and a reference conventional wood composite.
Figure 9C:
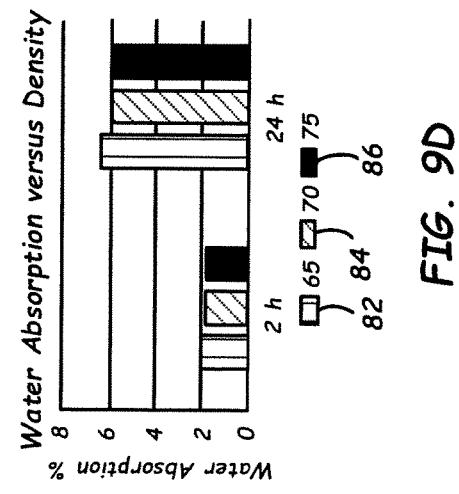
FIG. 9C shows a comparison plot of water absorption over a range of particle sizes.
Figure 9D:
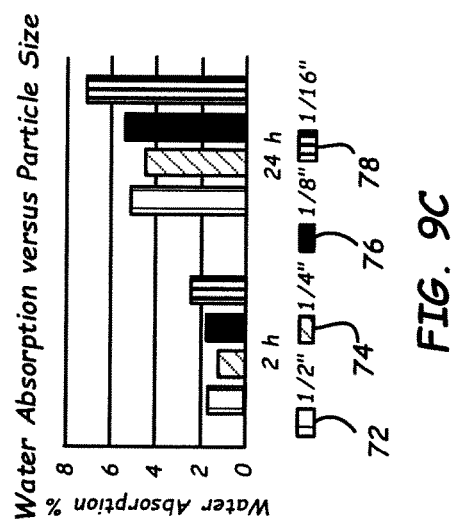
FIG. 9D shows a comparison plot of water absorption over a range of density configurations for the composites.

Water absorption results are presented in FIG. 9A, FIG. 9B, FIG. 9C and FIG. 9D. FIG. 9A shows water absorption versus MDI %. FIG. 9B shows water absorption versus MC percentage, FIG. 9C shows water absorption versus particle size, and FIG. 9D shows water absorption versus density. For FIGS. 9A-9D, like reference characters found in FIGS. 8A-8D are utilized for simplicity of understanding.

Comparing the overall results of water absorption for rWTB composited particle/fiberboards with the reference particleboard (see reference character 68 in FIG. 9A and FIG. 9B, MDI=4%, MC=10% wheat straw) indicate an excellent improvement over reference particleboard 68 by using rWTB material.

After 2 hours of immersion, the natural fiber-based particleboard absorbs 13.2% of water, wherein the maximum amount of absorbed water by rWTB composites particleboards is 2.74%. Such a result indicates that the maximum amount of absorbed water by reinforced particleboards is about 20.75% of the water absorbed by natural fiber-based particleboards. Moreover, after 24 hours of immersion, the maximum amount of absorbed water by rWTB composites particleboards is 8.24% and it is just about 17.34% of the water absorbed by natural fiber-based particleboards, a vast improvement.

The minimum amount of absorbed water after 2 hours of immersion is about 1.18% when the rWTB composites particle: fiberboards are configured with MDI=6%, MC>5% and ¼" particle size. After 24 hours of immersion, the same particle/fiberboard absorbed a minimum amount of water equal to about 4.51%. Accordingly, after 2 hours the amount of absorbed water by this particleboard was about 8.93% of the natural fiber-based particle/fiberboard and after 24 hours of immersion, the amount of sorbed water (adsorbed or absorbed) was about 9.49% or less of the natural fiber-based particleboard.

In specifically analyzing the data, the effects of MD on the water absorption of rWTB composites particle/fiberboards (e.g., see FIG. 9A), indicate that after 24 hours of immersion by increasing the MDI %, the amount of absorbed water reduced. By increasing the MDI % from 3% 62 to 6% 64, the amount of absorbed water reduced desirably but by increasing the MDI % from 6% 64 to 10% 6, the amount of absorbed water is not considerable.

Considering the effect of changing MC % on the water absorption of rWTB composites particle/fiberboard (e.g., see FIG. 9B), it is indicated that by increasing the MC % from 3% 69 to 5% 70, or after increasing MC % from 5% 70 to 8% 71, rWTB composites particleboards appear to show less absorbed water.

Investigating the effect of density on the water absorption of rWTB composites particle/fiberboards (e.g., see FIG. 9D, with MDI % and MC % held constant), it is indicated that rWTB particle/fiberboards absorbed less water when the density increased from 65 (see reference character 82) to 70 lb/ft³ (see reference character 82). However, after increasing the density to 75 lb/ft³ (see reference character 82), there is no change in the amount of absorbed water by rWTB particle/fiberboard.

For evaluating the effect of particle size on the water absorption of rWTB composite particle/fiberboards (e.g., see FIG. 9C, density constant at about 65 lb/ft³, obtained results indicate that by reducing particle size from ¼" 74 to ¹⁄₁₆" 78, rWTB particle/fiberboard absorbed more water. However, the result is different for ½" 72 particle size. In particular, rWTB composites particleboards with ½" 72 particle size absorbed more water than the particleboards with ¼" 74. Specifically, the amount of absorbed water by rWTB particleboard with ½" 72 is interestingly close to the particleboard with ⅛" 76.

Flame Spread Rate (FSR)/Flame Retardant Results

The flame retardant particle/fiberboard products were made using the methods as discussed above. Table 5 shown below illustrates the fire-retardant capabilities of the particle/fiberboards disclosed herein as per the flame spread rate (FSR) testing (ASTM E-84) standards for surface burning characterization of building materials, provided by Guardian Labs in Buffalo, N.Y.

Flame spread rate (FSR) is an industry metric of a material's propensity to burn rapidly and spread flames away from the source of ignition across the surface of a material or assembly. The purpose of such testing is to provide builders/architects/fire engineers, etc., with adequate information so that they can select appropriate material that will not contribute to the problem of life safety from fire within structures.

The methodology used for testing the materials disclosed herein entailed exposing the samples to a flame source to ignite them. The samples were self-supporting and a ¼" thick cement board was placed over the samples as lid protection. The rate and the distance or the flames spread, i.e., the FSR, were measured and assigned an index value based upon the results. The ASTM E-84 industry rating is as follows: A=0-25, B=26-75, C=76-200, D=201-500, and E=over 500. Accordingly, the lower the rating, the longer it takes the composite to catch on fire and the slower a flame spreads.

Accordingly, as illustrated in Table 5 below, three 12"× 12" samples were tested for flame spread rates (FSR) to illustrate the beneficial flame retardant properties of the particle/fiberboards disclosed herein; 1) Washington State University (WSU) fiber/particleboard, and for comparison testing: 2) natural fiber particle board and 3) Oriented strand board (OSB) board.

While the details of the results testing are shown in Table 5 below, it is of note that the WSU particle/fiberboard (Sample 1) had an ASTM rating of A with no audible crackling or cracking/crack widening or flaming burning through the material in contrast to the Natural fiber particle board (Sample 2) (also an A rating) though smoke levels were similar to that of the natural fiber particle board, which also had an ASTM rating of A. The OSB board (Sample 3) had a "B" rating and burned for 1 minute and 24 seconds after torch removed in contrast to the WSU particle/fiberboard (Sample 1) and the Natural fiber particle board (Sample 2).

TABLE 5

| Time: (Min-Second) | WSU particle/ fiberboard Test 1-Sample 1 | Natural fiber Particle Board Test 2-Sample 2 | OSB Board Test 3-Sample 1 |
| --- | --- | --- | --- |
| 00:00 | Flame source on | Flame source on | Flame source on |
| 00:15 | Discoloration; gaseous flaming; light smoke | Light flaming; discoloration | Light flaming; discoloration; light smoke |
| 00:30 | Flaming, and discoloration increase; no flame spread | Flaming and discoloration increase; light smoke | Flaming and discoloration increases |
| 01:00 | Gaseous flaming continues; discoloration and smoke increase | Flaming and discoloration continue to increase; light smoke; no flame spread | Gaseous flaming increases; sample starts to crack; smoke increases (medium) |
| 01:30 | No flame spread | Gaseous flaming increases; sample cracking at flame source area; smoke increases; no flame spread | No flame spread |
| 02:30 | No flame spread | Gaseous flaming increases; smoke increases: no flame spread | Cracks increasing and widening; flaming increases; no flame spread |
| 03:00 | No change to sample; no flame spread; medium smoke | Cracking at flame source increases; no flame spread; medium smoke | Flaming decreases; no flame spread; medium-heavy smoke |
| 04:30 | No change to sample | No change to sample | White discoloration of sample at flame source area; flames continue to decrease; medium smoke |
| 05:00 | No change to sample; no flame spread; medium smoke | flaming burns through material surface, 1" diameter at flame source area | No change to sample |
| 07:00 | Flaming decreases | Flaming decreases; cracks widening; medium smoke | Flaming decreases |
| 09:00 | No change to sample | No change to sample | Flaming continues decreasing |
| 10:00 | Torch off; all flames out | Torch off; all flames out | Torch off; audible crackling |
| 11:00 | N/A | N/A | Small gaseous flame; audible crackling continues |
| 11:24 | N/A | N/A | All flames out |

Tracker

It was discussed above that the present embodiments herein can include a system for processing composite materials for recycling and tracking and applying recycling credits to include for example in 40 (see FIG. 3), collecting and organizing information relating to composite products, such as wind turbine blades, in a software program.

Generally, the embodiments herein incorporate a tracking system/software methodology of manufactured wind turbine blades and/or resultant processed wind blade material (i.e., a Blade Tracker). However, while tracking of wind turbine blades and/or wind blade material or lots of the blades or material for recycling purposes so as to provide particle/fiberboards is a preferred embodiment, it must be noted that the tracking system/software can also be utilized to track any cured or uncured scrap, fiberglass, fiber-reinforced products, plastic, materials from boat hulls, and aircraft parts, etc. if desired for purposes of recycling into composites.

Figure 10:
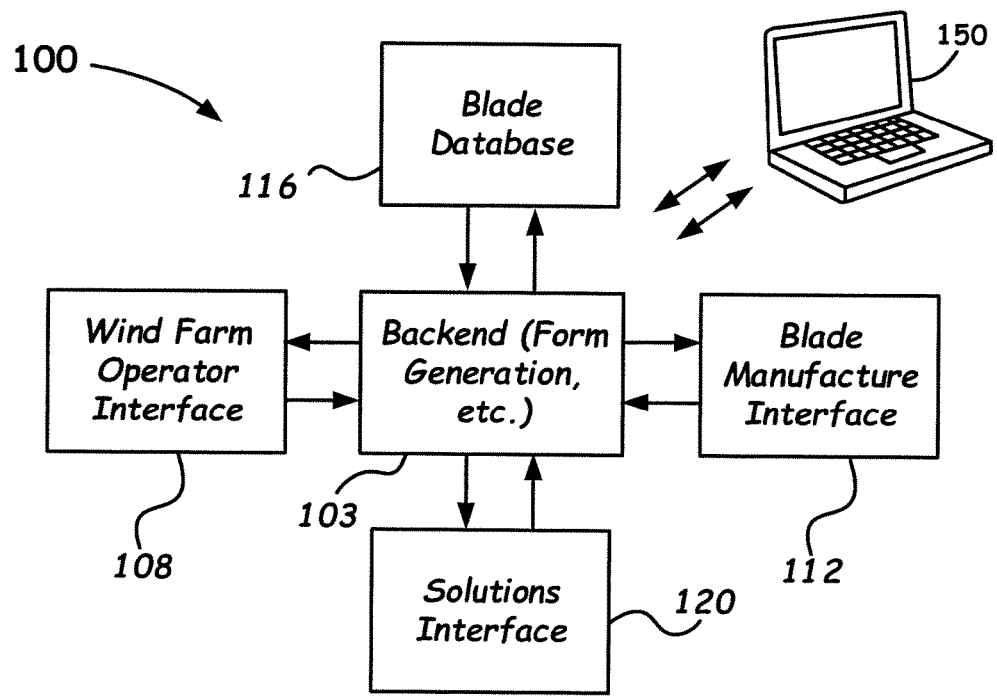
FIG. 10 shows a system/software flowchart for tracking wind turbine blades for recycling purposes, as disclosed herein.

FIG. 10 generally illustrates a system/software, as referenced by the numeral 100, for tracking wind turbine blades, as disclosed herein. The system 100 includes a controller and data system (generally shown by reference numeral 150), for monitoring and providing the user interface methodology. Controller and data system 150 is integrated with interfaces, i.e., a wind firm operator interface 108, a blade manufacturer interface a solutions interface 120, and a blade database interface 116 so as to enable forms and summary generation in a backend 103, as provided by an individual's work station (e.g., the wind farmer, blade manufacture, or an administrator).

Wind Farm Operator Interface

Initially, a user (e.g., an engineer, operator, technician, administrator (e.g., associated with a manufacturer, wind farm etc.)) opens a custom predesigned fixed and/or editable form 103 using an interface 108 provided by the system/software 100 using for example, a logic processor (computer) to be discussed below. For ease of use, the opening of one or more initial or subsequent form(s) can be provided with a graphical user interface (GUI). A form provided in the backend 103 (backend refers to enabled access by users indirectly through an external application, i.e., Blade Tracker software) thus enables a user to manipulate data or select options and thereafter, view screens, provided by for example, the GUI to see data or output data.

The form upon first being generated enables a new record (an instance) of a given turbine blade to be tracked from the moment stored in the system 100, and followed via a chain of custody. The initial input and following data input provides (assigns) initial data (blade creation, compositions, disposal time, any other relevant information (e.g., particular notes of blade material, extraneous data, etc.) needed for blade tracking throughout its lifetime.

The user can choose what form that they want to generate, and then enter any additional details needed to complete the form. Maintenance data, for example, is one such data entry that can be entered into this form during the blade's lifetime. There will be an option to either save the form or print it. There is also an option to automatically file (in memory) that form as well. As stated above, there is, if desired, a summary provided with data about the wind farm as a whole, in which the operator can see what blades are to be replaced, blades being transported to the farm, and various cost estimations and other information.

Blade Manufacturer Interface

With respect to the blade manufacturer interface 112, as one example embodiment, the manufacturer user of system 100 can choose to select a wind farm operator and specific blade which they would like to view. The blade manufacturer can thereafter view all relevant information at a blade or farm level on a given screen (e.g., using the GUI) so that they can plan production accordingly.

To aid in tracking the particular blade material or a material lot, the manufacturer can tag (an identifying tag) the material or lot for ease of tracking the chain of custody. The tag can be in the form of a non-machine readable label or other non-machine readable device. Examples of tags includes, but are not limited to, an RFID tag, a barcode, a hologram tag, or other suitable authentication device(s) that are coupled, included, or affiliated with a particular blade or reconfigured material resultant from a respective particular blade. Accordingly, the identification tag enables a user to track the material efficiently by having data entry by the manufacturer or subsequent holders of the material to be provided. For ease of use, such information can be easily uploaded for data entry to an existing or newly provided form and stored in the blade database 116 using system 100. Ease of uploading the information can be enabled using for example, a scanner, a barcode reader, operator input, or processes known and understood by those skilled in authenticating tracking systems.

Solutions Interface

With respect to the solutions interface 112, an administrator can view the data of all wind farms in a wind farm specific or overall view, to allow for the planning of recycling efforts. There is also a form to manipulate the data for any wind farm so that an administrator (e.g., Global Fiberglass Solutions) can provide support to wind farm operators having issues with their software.

The interfaces 108 (wind farm interface) and 112 (blade manufacturer interface) and solutions interface 120 for inputting data through any of the means discussed above, enables vital information to be provided by the database 116 with respect to, for example, blade creation, dimensions, compositions, etc.) maintenance, and disposal time. As stated above, such information, in providing particle/fiberboard products for particular buyers, increases desired product repeatability characteristics but also alerts those purchasers of particular lots of discarded blades that may resulted in less than desirable recycled products.

Figure 11:
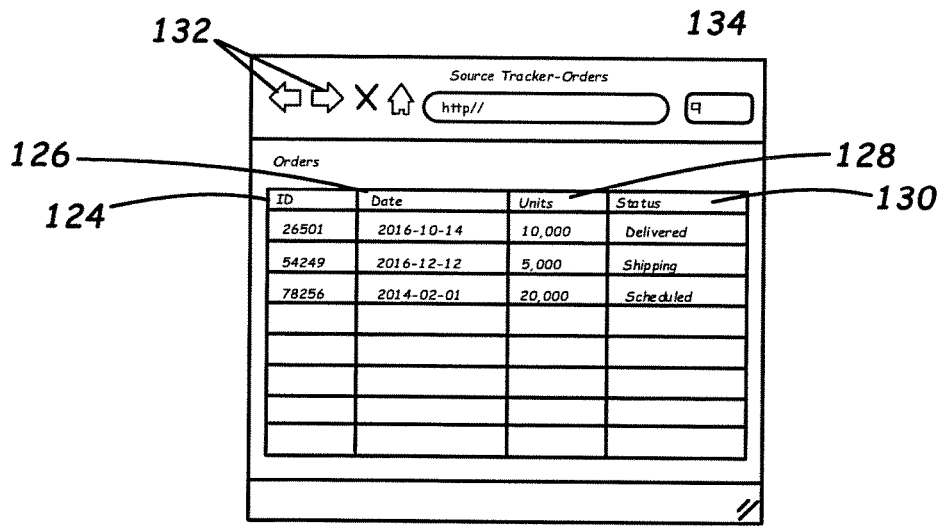
FIG. 11 shows an example screen of the tracking system/software for inputting data.
Figures 12, 13:
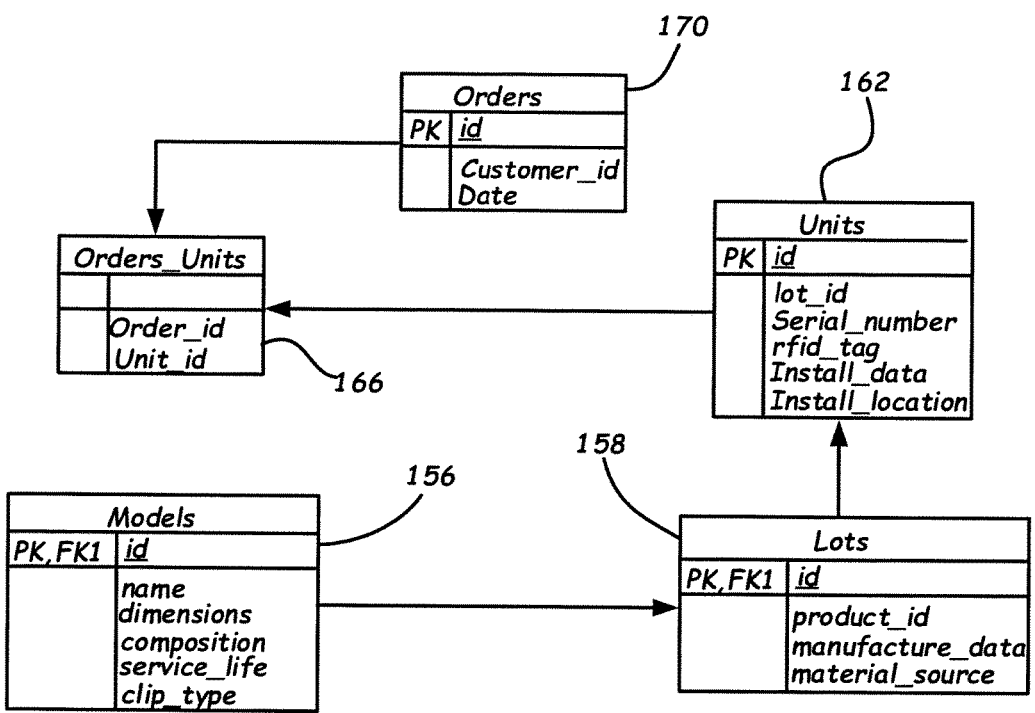
FIG. 12 shows an example screen of the tracking system/software, wherein editing of initial input data can be implemented.
FIG. 13 shows an example of the information architectural flow for the tracking/software system, as disclosed herein.

FIG. 11 illustrates an example screen of an order to be placed to include, for example, its identification ID (e.g., tagged ID) 124, associated date 126, units 128, and status 130. Also of note are associated controls (e.g., forward and back buttons 132) and a web browser input window (an http request 134) to system 100 acting as a server. The example http request 134 input window can thus enable other content, or perform other functions such as messaging a particular blade manufacturer. The response can and often contains information regarding a particular screen and associated tracked material. FIG. 12 illustrates an example screen wherein editing of initial input data can be implemented. Example editing functionality includes editing install dates 140 and a window for providing informational notes 142. FIG. 13 shows an example of the information architectural flow for tracking/software system 100. In particular, blade manufacturers and/or wind farm users can provide information on the models 156 for particular blades (so as to detail dimensions, compositions, etc.) and stored in database 116, as shown in FIG. 10. Orders 170 can be placed using form generation on the backend 103 (see FIG. 10) and tracked material of the lots 158 and units can be identified and ordered 166. As understood herein, lot(s) refers to a particular group, collection and/or large number or amount of wind turbine blade(s) or blade composite material.

Every user(s) of the tracking system 100 can thus authenticate into the system 100 using a unique username and password. If a wind farm operator or OEM decides to purchase the system 100, they are given a license number, which they can use to create as many user accounts as they want. Blade manufactures and wind farm owners are linked together. A blade manufacturer is able to create accounts that can access the data for their respective customers. The solutions interface 120, as shown in FIG. 10, will also have access to the same data as the blade manufacturer and all wind farm operators. Data flow and operations as shown in FIG. 13 follows the procedures generally shown in FIG. 10.

Wind farm operators and blade manufacturers can make changes to data, while an administrator provides customer support issues. OEM manufacturers (i.e., original equipment manufacturers) can also be provided access to the data, often in a read-only state. The respective interfaces communicates with the backend 103 (see FIG. 10) so as to make the necessary changes in the database 116 (see FIG. 10).

Turning back to FIG. 10, the system 100 can be localized but is more often and preferably a web based system that beneficially enables access from almost any computer with internet access, regardless of platform. Since the system can estimate when blades expire, recycling operations can be planned very efficiently from system data.

As an illustrative discussion for system 400, as shown in FIG. 10, such a system 100 can be directly or remotely directed by controller and data system of various circuitry of a known type. Such a control and data system 150 can thus be in the form of a desktop computer, a laptop computer, a network server, a server computer, or can be implemented by any one of or a combination of general or special-purpose processors (digital signal processor (DSP)), firmware, software, and/or hardware circuitry to provide instrument control, data analysis, etc., for the example configurations disclosed herein.

Individual software modules, components, and routines may also be utilized by system 100, as shown in FIG. 10 in the form of the disclosed software program, procedure, or process written in a suitable programming language, e.g., C, C#, C++. In addition, the computer programs, procedures, or processes may be compiled into intermediate, object, or machine code and presented for execution as instructions and control functions, so as to be implemented by system 100.

Various implementations of the source, intermediate, and/or object code and associated data may also be stored in one or more computer readable storage media that include read-only memory, random-access memory, magnetic disk storage media, optical storage media, flash memory devices, and/or other suitable media. As used herein, the term "computer readable storage media" excludes propagated signals, per se and refers to media known and understood by those of ordinary skill in the art, which have encoded information provided in a form that can be read (i.e., scanned/sensed) by a machine/computer and interpreted by the machine's/computer's hardware and/or software.

In preferred embodiments, system 100 is connected to other devices over other types of networks, including isolated local area networks and/or cellular telephone networks. The connection can also be a wireless connection or a physical coupling. As non-limiting examples of a wireless connection, such an arrangement can include commercial wireless interfaces, such as but not limited to, radio waves (WiFi), infrared (IrDA), or microwave technologies that also allow integration into available portable personal devices, such as, but not limited to, cell phones, pagers, personal identification cards, laptops, etc. The wireless communication can thus provide signals, including alert messages for expiring blades, etc.

With respect to physical wired coupling, the coupling can be by way of a dedicated coupling I/O means such as a USB port (not shown) to provide, for example, operational data (feedback) via the embedded software (e.g., firmware) or instructions received from or to system 100 using, as one arrangement, controller and data system 150.

In some embodiments, system 100 can also include an internet-based configuration interface (web-based platform) that enables remote adjustment of stored information. The interface can be accessible via a web browser, for example, over a secured or insecure network connection. The internet-based configuration interface permits remote updating of system 100 by a central computer system or another device.

Such a web-based platform enables portability and compatibility with existing customer systems. For a wind farm operation (i.e., an energy producer using wind turbine blades), the system can store blade information, generate all forms required for the blade, and make predictions from the blade information. A blade manufacturer will have the ability to view blade information and status from, for example, a wind farm, and then make production predictions from that data. An oversight organization with access can view all the data to plan recycling efforts and to act as an administrator.

In an exemplary method of operation using the tracker system 100 (see FIG. 10), to illustrate how a composite panel can be finally provided, a rWTB feedstock is received at a panel processing facility (PPF) in 1" minus (less than 1" in any orientation) particles (tracker software utilized to track this material so as to maintain consistent ratio of glass fiber to wood). Initial grinding of the blade is done in the field (e.g., at a wind farm where material is to be discarded) with mobile equipment to get it down to a 1"-minus size fraction (e.g., at least one inch or less in one or more dimensions). The rWTB is further refined with a hammer-mill (or similar mechanical mill) to a consistent size ideal for the panel produced. The refined rWTB is then sent to a dry blender system, either continuous or batch, sprayed with resin, potentially water, and any other processing additives that may be considered. Resin, water and liquid additives are generally sprayed with air pressure where the liquids are air atomized and then dispersed on the surface of the rWTB. The rWTB that has been dry blended with the resin and other additives (called the "furnish") is then formed into an evenly distributed mat on a continuous belt. The formed continuous mat of furnish then enters a press, where pressure and heat are applied to the mat. After 2-10 minutes, the resin has cured and the panel is pushed out of the press. The panel is cut to the desired dimensions and sanded to smooth the surface for secondary lamination or final use.

Having now fully described the inventive subject matter, it will be appreciated by those skilled in the art that the same can be performed within a wide range of equivalent parameters; concentrations, and conditions without departing from the spirit and scope of the disclosure and without undue experimentation.

It is to be understood that features described with regard to the various embodiments herein may be mixed and matched in any combination without departing from the spirit and scope of the invention. Although different selected embodiments have been illustrated and described in detail, it is to be appreciated that they are exemplary, and that a variety of substitutions and alterations are possible without departing from the spirit and scope of the present invention.

We claim:

1. A recycling method of producing a flame retardant composite product, comprising:
   tracking a composite wind turbine blade material throughout its chain of custody;
   processing the wind turbine blade material identified in the tracking step to provide a plurality of wind turbine blade (WTB) feedstock pieces that are one inch or less in one or more dimensions;
   receiving the processed wind turbine blade (WTB) feedstock pieces at a processing facility (PPF);

refining the processed wind turbine blade (WTB) feedstock to provide a plurality of composite pieces ranging from about 1/16 inches up to about 1/2 inches in one or more dimensions;

spraying the plurality of composite pieces with one or more liquids to provide a flame retardant composite mixture, wherein the one or more liquids further comprises: a polymeric methyl-diisocyanate (MDI) resin ranging from 3% up to about 10% in content, a water content, and one or more additives;

forming the flame retardant composite mixture into a shape for providing a resultant flame retardant composite product;

hot pressing the formed flame retardant composite mixture at a temperature and pressure to cure the shaped composite mixture; and cutting the cured flame retardant composite mixture to one or more dimensions in height, length and width to provide the resultant flame retardant composite product.

2. The recycling method of claim 1, wherein the water content comprises about a 5% moisture content (MC) added to an existing moisture content.

3. The recycling method of claim 1, wherein the one or more additives further comprises at least one of: binders, fillers, catalysts, strengthening agents, fillers, aggregate solid particulates, aggregate rock, gravel, sand, wood, textiles, pipes, rods, bars, fibers, metals, honeycombs, spacers, fillers, catalysts, recycled polymers, paper fibers, binders, cement, magnesium oxide, cement, limestone, granite, silica, and chemical additives.

4. The recycling method of claim 1, wherein the tracking step further comprises collecting and organizing information with respect to the composite wind turbine blade material utilized by an energy producer.

5. The recycling method of claim 4, wherein the tracking step further comprises checking for a consistent glass to wood ratio of the collected information of the composite wind turbine blade material.

6. The recycling method of claim 4, wherein the tracking step further comprises recycling credits back to the energy producer.

7. The recycling method of claim 1, further comprising: tagging the manufactured one or more wind turbine blades or a processed material resulting from the one or more manufactured one or more wind turbine blades or tagging a collection of manufactured one or more wind turbine blades or tagging processed materials resulting from the collection of manufactured one or more wind turbine blades, wherein the tagging enables ease of tracking the chain of custody.

8. The recycling method of claim 7, wherein the tagging further comprises a tag in the form of at least one of: a non-machine readable label, a non-machine readable device, an RFID tag, a barcode, and a hologram tag.

9. The recycling method of claim 1, wherein the resultant flame retardant composite product is a particle/fiberboard configured with mechanical properties that further comprises: a modules of elasticity (MOE) of up to about 7.41E+5 psi, a modulus of rupture (MOR) of up to about 5.914E+5 psi, and an internal bond strength (IB) of at least 100 psi.

10. The method of recycling claim 1, wherein the resultant flame retardant composite product is a particle/fiberboard configured so that the amount of sorbed water is less than about 9.49% of a natural fiber-based particleboard after 24 hours of immersion and wherein the resultant flame retardant composite product is configured so that a maximum thickness swelling is less than about 13.5% of a natural fiber-based particleboard after 24 hours of immersion.

* * * * *